United States Patent
Tominaga et al.

(10) Patent No.: US 10,861,411 B2
(45) Date of Patent: Dec. 8, 2020

(54) DISPLAY DEVICE

(71) Applicant: Sharp Kabushiki Kaisha, Sakai (JP)

(72) Inventors: Masakatsu Tominaga, Sakai (JP); Masahiro Yoshida, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 16/741,798

(22) Filed: Jan. 14, 2020

(65) Prior Publication Data
US 2020/0234674 A1    Jul. 23, 2020

Related U.S. Application Data

(60) Provisional application No. 62/793,404, filed on Jan. 17, 2019.

(51) Int. Cl.
*G09G 5/00* (2006.01)
*G09G 3/36* (2006.01)

(52) U.S. Cl.
CPC ............ *G09G 5/006* (2013.01); *G09G 3/3659* (2013.01); *G09G 2310/08* (2013.01); *G09G 2320/103* (2013.01)

(58) Field of Classification Search
CPC ................ G09G 5/006; G09G 3/3659; G09G 2320/103; G09G 2310/08; G09G 2300/0426; G09G 3/2096; G09G 3/3648; G06F 3/044
See application file for complete search history.

(56) References Cited

U.S. PATENT DOCUMENTS

| 8,654,083 | B2* | 2/2014 | Hotelling | G06F 3/044 345/173 |
| 2014/0028535 | A1* | 1/2014 | Min | G09G 3/3655 345/87 |
| 2014/0152617 | A1* | 6/2014 | Kida | G06F 3/044 345/174 |
| 2014/0253498 | A1* | 9/2014 | Suzuki | G06F 3/04166 345/174 |
| 2016/0202835 | A1* | 7/2016 | Mizuhashi | G02F 1/13306 345/174 |
| 2016/0240163 | A1* | 8/2016 | Yamamoto | G06F 3/0416 |
| 2016/0370931 | A1* | 12/2016 | Sakamoto | G09G 3/3648 |
| 2018/0107317 | A1 | 4/2018 | Tanaka et al. | |

FOREIGN PATENT DOCUMENTS

JP     2018-063666 A    4/2018

* cited by examiner

*Primary Examiner* — Andrew Sasinowski
(74) *Attorney, Agent, or Firm* — Keating & Bennett, LLP

(57) ABSTRACT

A display device includes an image line and a position detecting line disposed in a display area and a signal processor, a first switch circuit, a second switch circuit, a common signal source, and a third switch circuit disposed outside the display area. The signal processor is configured to perform a feeding of an image signal and position detection with time-division. The first switch circuit is configured to electrically connect the image line to the signal processor in synchronization with the feeding of the image signal. The second switch circuit is configured to electrically connect the position detecting line to the signal processor in synchronization with the position detection. The common signal source is configured to feed a common signal. The third switch circuit is configured to electrically connect the position detecting line to the common signal source in synchronization with the feeding of the image signal.

15 Claims, 17 Drawing Sheets

DISPLAY DEVICE

CROSS REFERENCE TO RELATED APPLICATION

This application claims priority from U.S. Provisional Patent Application No. 62/793,404 filed on Jan. 17, 2019. The entire contents of the priority application are incorporated herein by reference.

TECHNICAL FIELD

The technology described herein relates to a display device.

BACKGROUND

An example of a conventional display device described in Japanese Unexamined Patent Application Publication No. 2018-63666 has been known. A display driver included in the display device includes a source output terminal, a source driver circuit, connecting lines, and a selector. The source output terminal is connected to a source input terminal of a display panel. The source driver circuit generates source signals supplied to the source input terminal. The connecting lines are configured to detect a capacitance of a conductive member connected to the input. The connecting lines are connected to the input of a capacitance detecting circuit. The capacitance detecting circuit provides the detected capacitance and generates capacitance data used for detection of touch events in which an object touches the display panel. The selector is configured to connect the source output terminal to any one of connecting options including the source driver circuit and the connecting lines.

In the display device, the switch circuit for switching connection between touch detecting electrodes and the source input terminals, a source line selector circuit for driving with time-division, and a VCOM switch circuit having a function of applying a common voltage to each common electrode are disposed on a selector side relative to the display circuit. Therefore, a width of a frame tends to increase on the selector side.

SUMMARY

The technology described herein was made in view of the above circumstances. An object is to reduce a width of a frame.

A display device includes at least one image line, at least one position detecting lines, a signal processor, a first switch circuit, a second switch circuit, a common signal source, and a third switch circuit. The at least one image line is disposed in a display area in which an image is displayed. The at least one position detecting line is disposed in the display area. The signal processor is disposed outside the display area and configured to perform a feeding of an image signal and position detection with time-division. The first switch circuit is disposed on a signal processor side relative to the display area outside the display area, connected to the at least one image line and the signal processor, and configured to electrically connect the at least one image line to the signal processor in synchronization with the feeding of the image signal by the signal processor. The second switch circuit is disposed on a signal processor side relative to the display area outside the display area, connected to the at least one position detecting line and the signal processor, and configured to electrically connect the at least one position detecting line to the signal processor in synchronization with the position detection by the signal processor. The common signal source is disposed on an opposite side from the signal processor relative to the display area outside the display area and configured to feed a common signal. The third switch circuit is disposed on an opposite side from the signal processor relative to the display area outside the display area, connected to the at least one position detecting line and the common signal source, and configured to electrically connect the at least one position detecting line to the common signal source in synchronization with the feeding of the image signal by the signal processor.

According to the technology described herein, the width of the frame can be reduced.

DETAILED DESCRIPTION

First Embodiment

Figure 1:
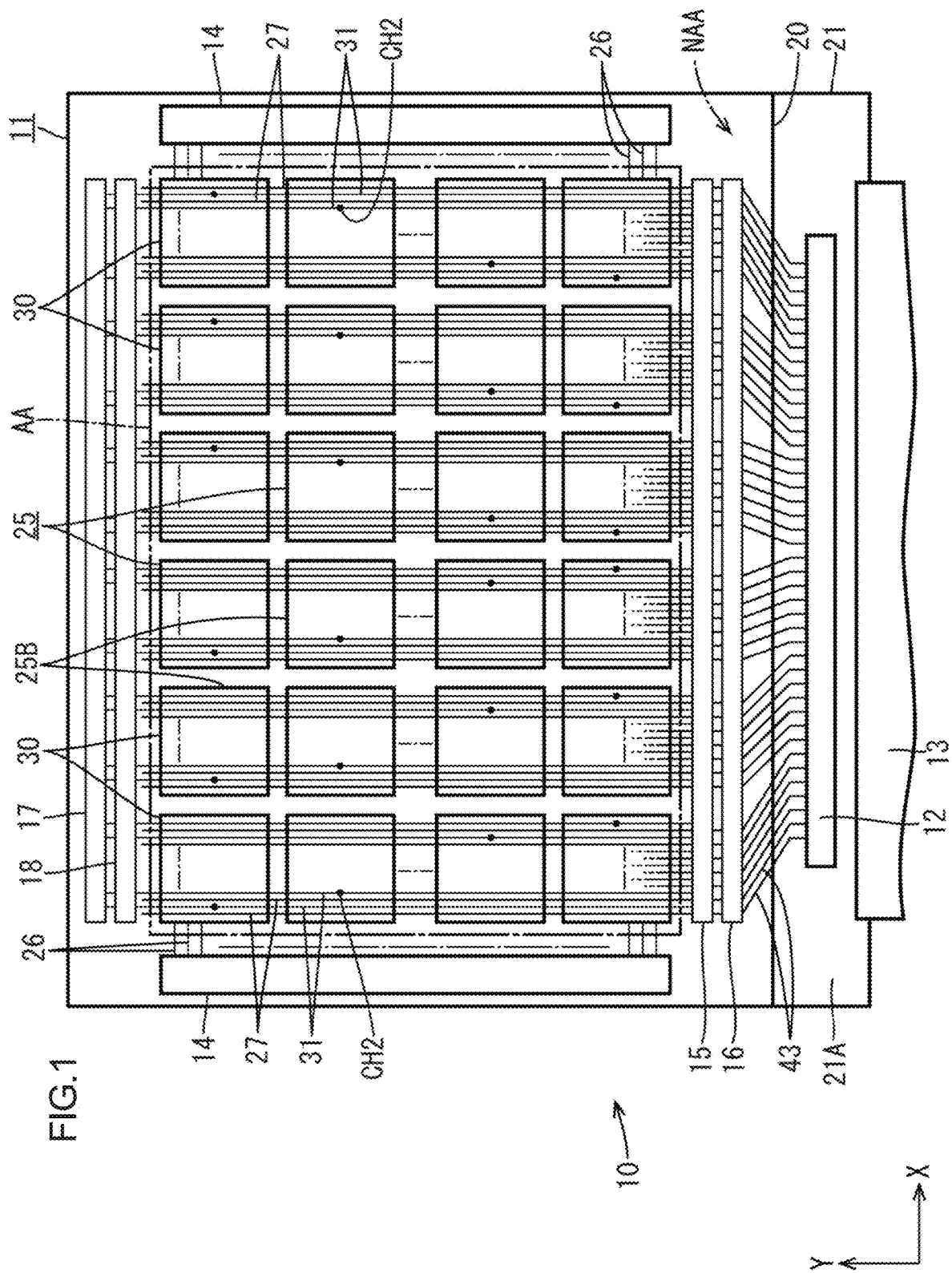
FIG. 1 is a plan view of a liquid crystal panel included in a liquid crystal display device according to a first embodiment illustrating source lines, touch electrodes, and touch lines.

A first embodiment of the technology described herein will be described in detail with reference to FIGS. 1 to 14. In this section, a liquid crystal display device 10 (a display device, a display device having an input position detecting function) having a display function and a touch panel function (a positional input function) will be described. In the drawings, X-axes, Y-axes, and Z-axes may be present.

The axes in each drawing correspond to the respective axes in other drawings. An upper side and a lower side in FIGS. 3, 5, 8, 12 to 14, and 17 correspond with a front side and a rear side of the liquid crystal display device 10, respectively.

FIG. 1 is a schematic plan view of a liquid crystal panel 11. As illustrated in FIG. 1, the liquid crystal display device 10 has a horizontally-long rectangular and includes at least the liquid crystal panel 11 (a display device, a display pane, a display panel having an input position detecting function) and a backlight unit (a lighting device). The liquid crystal panel 11 is configured to display images. The backlight unit is an external light source configured to apply light to the liquid crystal panel 11 for image display. The backlight unit is disposed behind (on a back side of) the liquid crystal panel 11. The backlight unit includes a light source (e.g., LEDs) configured to emit white light and an optical member configured to exert optical effects on the light from the light source to convert the light into planar light.

As illustrated in FIG. 1, the liquid crystal panel 11 includes a middle area defined as a display area AA (an area defined by a chain line in FIG. s 1) in which images are displayed. An outer area of a screen of the liquid crystal panel 11 having a frame shape to surround the display area AA is defined as a non-display area NAA in which the images are not displayed. The liquid crystal panel 11 includes two substrates 20 and 21 that are bonded together. One of the substrates 20 and 21 on the front side is a CF substrate 20 (an opposed substrate) and the other on the rear side (the back light) is an array substrate 21 (a display device substrate, an active matrix substrate). The CF substrate 20 and the array substrate 21 include various films stacked on inner surfaces of glass substrates. Polarizing plates, which are not illustrate, are bonded to outer surfaces of the substrates 20 and 21. The CF substrate 20 has a short dimension smaller than that of the array substrate 21. The CF substrate 20 is bonded to the array substrate 21 with one of edges separated from each other in a direction along a short edge (the Y-axis direction) aligned with a corresponding edge of the array substrate 21. The other edge of the array substrate 21 on an opposite side in the direction along the short edge laterally projects from the CF substrate 20. A portion of the array substrate 21 not overlapping the CF substrate 20 is defined as a CF substrate non-overlapping portion 21A. A driver 12 (a signal source, a source driver) and a flexible substrate 13 are mounted on the CF substrate non-overlapping portion 21A. The driver 12 is configured to process various signals.

The driver 12 includes an LSI chip that includes a driver circuit inside. The driver 12 is mounted on the CF substrate non-overlapping portion 21A of the array substrate 21 with the chip on glass (COG) technology. As illustrated in FIG. 1, the driver 12 disposed adjacent to one of edges of the display area AA in the Y-axis direction between the display area AA and the flexible substrate 13, which will be described later. The driver 12 is configured to perform feedings of image signals to source lines 27 (image lines, data lines), which will be described later), disposed in the display area AA. The source lines 27 extend substantially in the Y-axis direction. The source lines 27 include trunk portions 27A and lead portions 27B. The trunk portions 27A are mostly disposed in the display area AA. Two of the lead portions 27B are drawn from ends of each of the trunk portions 27A disposed in the non-display area NAA. The flexible substrate 13 includes a substrate made of a synthetic resin having an insulating property and flexibility (e.g., a polyimide-based resin) and a number of line patterns formed on the substrate. The flexible substrate 13 includes a first end connected to the non-display area NAA of the liquid crystal panel 11 and a second end connected to a control circuit board (a signal source). The various signals supplied by the control circuit board are transmitted to the liquid crystal panel 11 via the flexible substrate 13 and output to the display area AA after processed by the driver 12 in the non-display area NAA. In the non-display area NAA of the array substrate 21, two gate circuits 14 are disposed to sandwich the display area AA therebetween from sides with respect to the X-axis direction. The gate circuits 14 have a band shape to extend in the Y-axis direction. Two gate circuits 14 are provided to sandwich the display area AA therebetween from sides with respect to the X-axis direction. The gate circuits 14 are configured to perform feedings of the scanning signals to gate lines 26 (scanning lines), which will be described later, in the display area AA. The gate lines 26 extend substantially in the X-axis direction. The gate lines 26 include ends drawn to the non-display area NAA and connected to the gate circuits 14, respectively. The gate circuits 14 are provided in a monolithic form. The gate circuits 14 include circuits configured to output the scanning signals at predefined timings and buffer circuits configured to amplify the scanning signals.

The liquid crystal panel 11 according to this embodiment has the display function and the touch panel function. The display function is for displaying images. The touch panel function is for detecting positions of inputs (input positions) by a user based on displayed images. Touch panel patterns for the touch panel function are integrated (with the in-cell technology). The touch panel patterns use a projected capacitance method. The touch panel patterns use a self-capacitance method for detection. As illustrated in FIG. 1, the touch panel patterns include touch electrodes 30 (position detecting electrodes) arranged in a matrix within a plate surface of the liquid crystal panel 11. The touch electrodes 30 are disposed in the display area AA of the liquid crystal panel 11. The display area AA of the liquid crystal panel 11 substantially corresponds with a touch area (an input position detectable area), in which positions of inputs are detectable. The non-display area NAA substantially corresponds with a non-touch area (an input position non-detectable area), in which positions of inputs are not detectable. A finger of the user is a conductive member (a position input member). When the use brings the finger closer to a surface (a display surface) of the liquid crystal panel 11 to perform a position input operation based on an image displayed in the display area AA of the liquid crystal panel 11, a capacitor is formed between the finger and the touch electrode 30. A capacitance measured at the touch electrode 30 adjacent to the finger varies as the finger approaches thereto. The capacitance becomes different from a capacitance measured at the touch electrode 30 away from the finger. Therefore, the position of input can be detected based on the difference in capacitance. Lines of the touch electrodes 30 are arranged in the X-axis direction and the Y-axis direction at intervals to form the matrix in the display area AA. Each of the touch electrodes 30 has a rectangular shape in a plan view. A length of each side is some millimeters (e.g., from 2 mm to 5 mm). The touch electrodes 30 are significantly larger than pixels PX, which will be described later, when viewed in plan. Each of the touch electrodes 30 straddles multiple pixels PX (e.g., dozens of the pixels PX) in the X-axis direction and the Y-axis direction.

As illustrated in FIG. 1, touch lines 31 (position detecting lines) are selectively connected to the touch electrodes 30 provided in the liquid crystal panel 11. The touch lines 31 extend in the Y-axis direction to cross the touch electrodes 30 arranged in the Y-axis direction. The touch lines 31 are selectively connected to the specific touch electrodes 30. The touch lines 31 are independently connected to the touch electrodes 30. The number of the touch lines 31 overlapping one touch electrode 30 is equal to the number of the touch electrodes 30 in the Y-axis direction. The number of the touch lines 31 overlapping one touch electrode 30 is smaller than the number of the source lines 27 overlapping one touch electrode 30. In FIG. 1, sections of the touch lines 31 connected to the touch electrodes 30 (touch line contact holes CH2, which will be described later) are indicated by black dots. The touch lines 31 include trunk sections 31A and lead sections 31B. The trunk sections 31A are mostly disposed in the display area AA. Two of the lead sections 31B are drawn from ends of each of the trunk sections 31A disposed in the non-display area NAA. The touch lines 31 are connected to a detector circuit included in the driver 12. In FIG. 1, the arrangement of the touch electrodes 30 is schematically illustrated. The number, the arrangement, and the two-dimensional shape of the touch electrodes 30 may be altered from those illustrated in FIG. 1 where appropriate.

As illustrated in FIG. 1, a first switch circuit 15, a second switch circuit 16, a common signal source 17, and a third switch circuit 18 are disposed on a CF substrate non-overlapping section 21A (a driver 12) side relative to the display area AA in the Y-axis direction in the non-display area NAA of the array substrate 21. The first switch circuit 15 is connected to the source lines 27. The second switch circuit 16 is connected to the touch lines 31. The common signal source 17 is configured to perform feedings of common signals. The third switch circuit 18 is connected to the touch lines 31 and the common signal source 17. The first switch circuit 15 and the second switch circuit 16 are disposed on a driver 12 side relative to the display area AA in the Y-axis direction. The common signal source 17 and the third switch circuit 18 are disposed on a driver 12 side relative to the display area AA in the Y-axis direction. According to the arrangement, a width of a section of the non-display area NAA of the array substrate 21 on the driver 12 side relative to the display area AA in the Y-axis direction is maintained smaller in comparison to a configuration in which the switch circuits and the common signal source are all disposed on the driver 12 side relative to the display area. The first switch circuit 15, the second switch circuit 16, the common signal source 17, and the third switch circuit 18 will be described in detail later.

Figure 2:
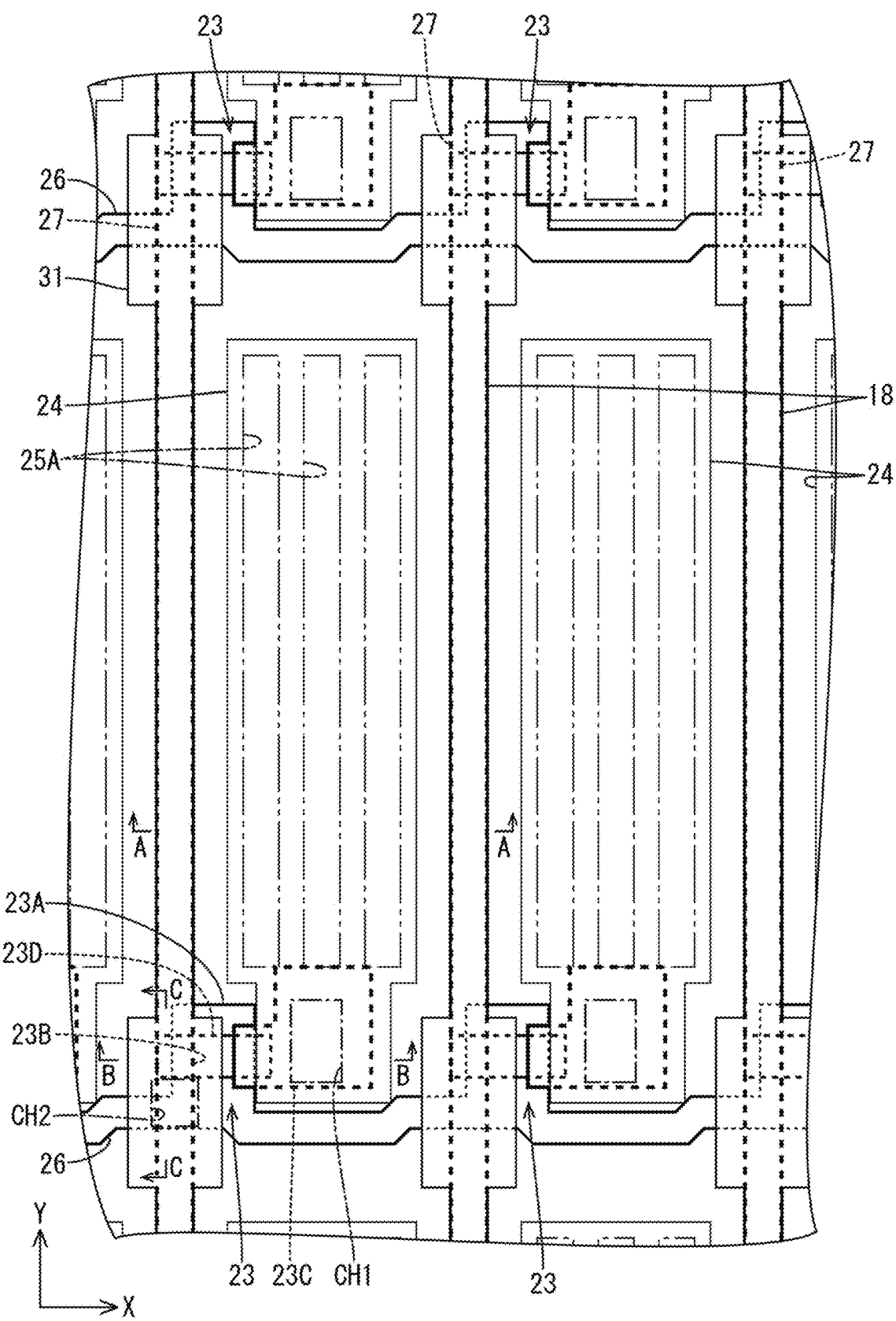
FIG. 2 is a plan view of the liquid crystal panel illustrating an arrangement of pixels.

FIG. 2 is a plan view of a section of the array substrate 21 included in the liquid crystal panel 11 in the display area AA. As illustrated in FIG. 2, thin film transistors (TFTs) 23 (pixel switch components) and pixel electrodes 24 are disposed on the inner surface of the array substrate 21 in the display area AA. Lines of the TFTs 23 and lines of the pixel electrodes 24 are arranged at intervals in the X-axis direction and the Y-axis direction to form a matrix. Around the TFTs 23 and the pixel electrodes 24, the gate lines and the source lines 27 are routed substantially perpendicular to (to cross) each other. The gate lines 26 are connected to gate electrodes 23A of the TFTs 23. The source lines 27 are connected to source electrodes 23B of the TFTs 23. The pixel electrodes 24 are connected to drain electrodes 23C of the TFTs 23. When the TFTs 23 turn on based on the scanning signals supplied through the gate lines 26, the TFTs 23 feed the image signals that will be transmitted to the source lines 27 from the source electrodes 23B to the drain electrodes 23C via channels 23D (semiconductor portions). The pixel electrodes 24 are charged to potentials based on the image signals. Each of the pixel electrodes 24 has a vertically-long rectangular in a plan view. A short dimension and a long dimension of each of the pixel electrodes 24 extend in a direction in which the gate lines 26 extend and in a direction in which the source lines 27 extend, respectively.

Configurations of the TFTs 23 and the pixel electrodes 24 will be described in detail. As illustrated in FIG. 2, the TFTs 23 include the gate electrodes 23A that branch out from the gate lines 26. The gate electrodes 23A project from the gate lines 26 in the Y-axis direction toward the upper side in FIG. 2. Each of the gate electrodes 23A has a rectangular shape. The TFTs 23 include the source electrodes 23B that include sections of the source lines 27 (sections overlapping the gate electrodes 23A). The source electrodes 23B are locates at ends of the TFTs 23 on one side in the X-axis direction. About entire areas of the source electrodes 23B overlap the gate electrodes 23A. The source electrodes 23B are connected to the channels 23D. The TFTs 23 include the drain electrodes 23C disposed away from the source electrodes 23B in the X-axis direction. The drain electrodes 23C extend substantially in the X-axis direction. The drain electrodes 23C include first ends and second ends. The first ends are opposed to the source electrodes 23B and overlap the gate electrodes 23A. The first ends are connected to the channels 23D. The second ends are connected to the pixel electrodes 24. The TFTs 23 include the channels 23D that are made of a semiconductor material. Each of the channels 23D has a horizontally-long rectangular extending in the X-axis direction. The channels 23D include first ends connected to the source electrodes 23B and second ends connected to the drain electrodes 23C. Each of the pixel electrodes 24 has a rectangular shape. The pixel electrodes 24 overlap corresponding pixel holes 29A in a black matrix 29. Edges of the pixel electrodes 24 on the lower side in the Y-axis direction in FIG. 2 overlap the drain electrodes 23C and are connected to the drain electrodes 23C.

Figure 3:
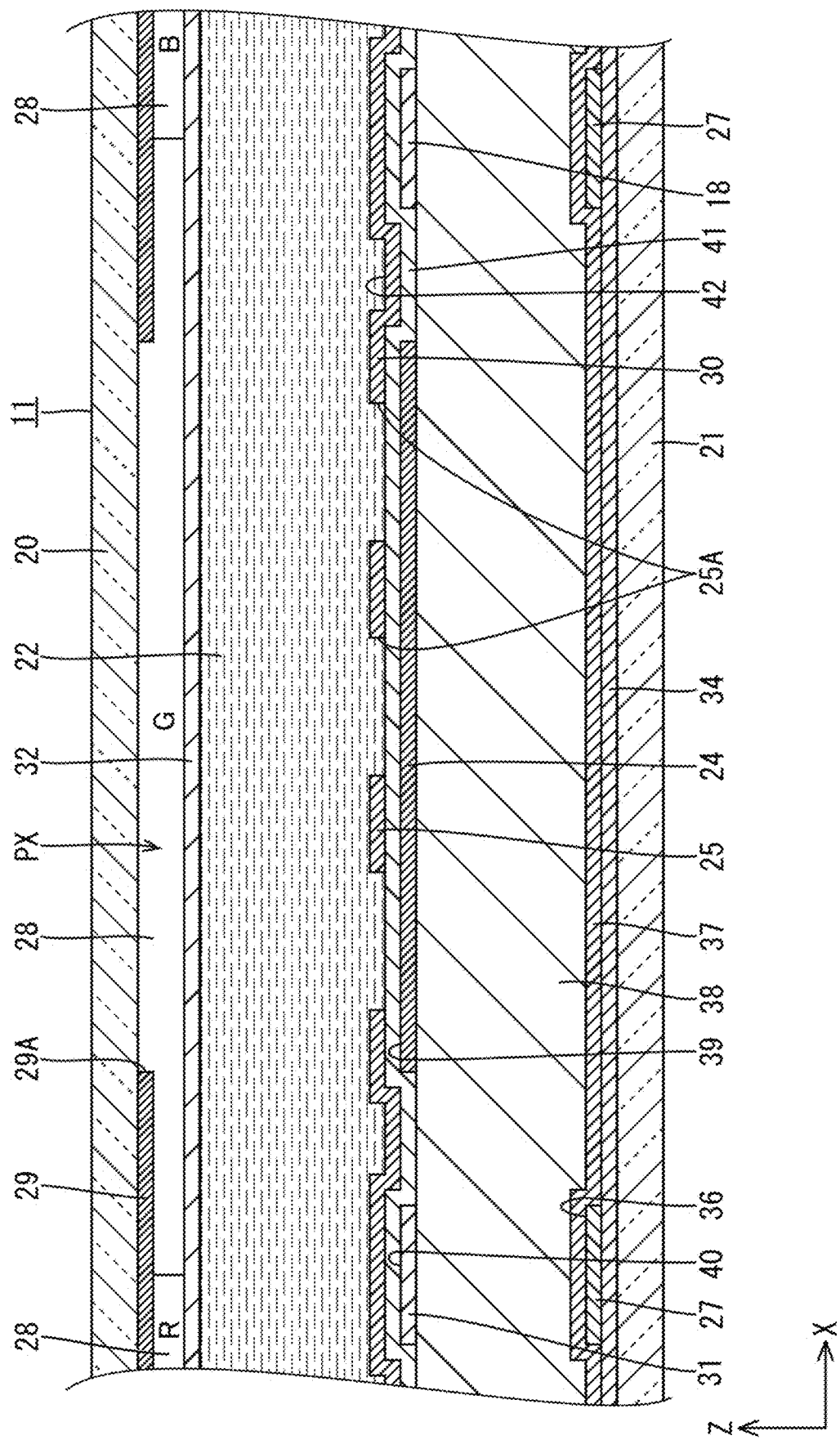
FIG. 3 is a cross-sectional view of the liquid crystal panel along line A-A in FIG. 2.

FIG. 3 is a cross-sectional view of a section of the liquid crystal panel 11 including the middle section of the pixel PX. As illustrated in FIG. 3, the liquid crystal panel 11 includes a liquid crystal layer 22 (a medium layer) disposed between the substrates 20 and 21. The liquid crystal layer 22 includes liquid crystal molecules. The liquid crystal molecules are substances having an optical characteristic that varies according to application of an electric field. This embodiment includes spacers disposed between the substrates 20 and 21 for maintaining a gap between the substrates 20 and 21. Three colors of color filters 28 that exhibit blue (B), green (G), and red (R) are disposed on an inner surface side of the CF substrate 20 of the liquid crystal panel 11 in the display area AA. The different colors of the color filters 28 are repeatedly arranged in lines along the gate lines 26 (the X-axis direction). The lines of the color filters 28 extend along the source lines 27 (substantially in the Y-axis direction) to form stripes. The color filters 28 are disposed to overlap the pixel electrodes 24 on the array substrate 21 in a plan view. Borders between the color filters 28 that are adjacent to each other in the X-axis direction and exhibit to the different colors overlap the source lines 27 (including touch lines 31). In the liquid crystal panel 11, each R color filter 28, each G color filter 28, and the pixel electrode 24 that are arranged in the X-axis direction and the pixel electrodes 24 that are opposed to the R, the G, and the B color filters 28 form three colors of the pixels PX. In the liquid crystal panel 11, the R, the G, and the B pixels PX arranged in the X-axis direction form display pixels for color display in predefined tones. The black matrix 29 (an inter-pixel light blocking portion) is disposed on the CF substrate 20. The black matrix 29 is formed in a grid pattern in the plan view to separate the adjacent color filters 28 (the pixel electrodes 24). The black matrix 29 includes the pixel holes 29A at positions overlapping large areas of the pixel electrodes 24 on the array substrate 21 in the plan view. Light passed through the pixel electrodes 24 is output to the outside of the liquid crystal panel 11 through the pixel holes 29A. The black matrix 29 is disposed to overlap at least the gate lines 26 and the source lines 27 (including the touch lines 31) on the array substrate 21 in the plan view. An OC film 32 is formed in a solid pattern in a layer upper than the color filters 28 (on the liquid crystal layer 22 side) for an about entire area of the CF substrate 20. Alignment films are formed on the innermost surfaces of the substrates 20 and 21 contacting the liquid crystal layer 22 for orienting the liquid crystal molecules includes in the liquid crystal layer 22.

Next, a common electrode 25 will be described. As illustrated in FIGS. 2 and 3, the common electrode 25 is disposed in a layer upper than the pixel electrodes 24 on an inner surface side of the array substrate 21 in the display area AA to overlap all of the pixel electrodes 24. A constant reference voltage is normally supplied to the common electrode 25 except for periods for detecting positions of inputs by the finger, which is the position inputting member, (sensing periods). The common electrode 25 extends for the about entire display area AA. Sections of the common electrode 25 overlapping the pixel electrodes 24 include pixel overlapping voids 25A (pixel overlapping slits, orientation control slits). The pixel overlapping voids 25A extend in the longitudinal direction of the pixel electrodes 24. The number, the shape, and forming areas of the pixel overlapping voids 25A may be altered from those illustrated in the drawings where appropriate. When the pixel electrodes 24 are charged and differences are created between the pixel electrodes 24 and the common electrode 25 that overlap each other, fringe electric fields (oblique electric fields) are generated between edges of the pixel overlapping voids 25A and the pixel electrodes 24. Each fringe electric field includes a component along the plate surface of the array substrate 21 and a component in a normal direction to the plate surface of the array substrate 21. Using the fringe electric fields, the orientation of the liquid crystal molecules in the liquid crystal layer 22 can be controlled. The liquid crystal panel 11 in this embodiment is configured to operate in fringe field switching (FFS) mode. The common electrode 25 includes the touch electrodes 30. The common electrode 25 includes partition voids 25B (partition slits) for partitioning the adjacent touch electrodes 30 (see FIG. 1) in addition to the pixel overlapping voids 25A. The partition voids 25B include horizontal portions and vertical portions to form a grid as a whole in the plan view. The horizontal portions extend horizontally across the common electrode 25 for an entire dimension in the X-axis direction. The vertical portions extend vertically across the common electrode 25 for an entire dimension in the Y-axis direction. The common electrode 25 includes the touch electrodes 30 that are partitioned by the partition voids 25B and arranged in a grid in the plan view. The touch electrodes 30 are electrically isolated from each other. The common signals (the reference voltage signals) related to the display function are transmitted to the touch electrodes 30 through the touch lines 31 during the display period in which the images are displayed. During the sensing period, the capacitance is detected by the touch lines 31. The common signals are transmitted to all of the touch lines 31 at the same timing and thus all of the touch lines 31 are held at the reference potential and function as the common electrode 25. The touch lines 31 are disposed to overlap the source lines 27 in the plan view. A width of each touch line 31 is about equal to a width of each source line 27 for the most part but a width of the touch line is larger than the width of the source line 27 for some parts (portions overlapping the gate lines 26).

Figure 4:
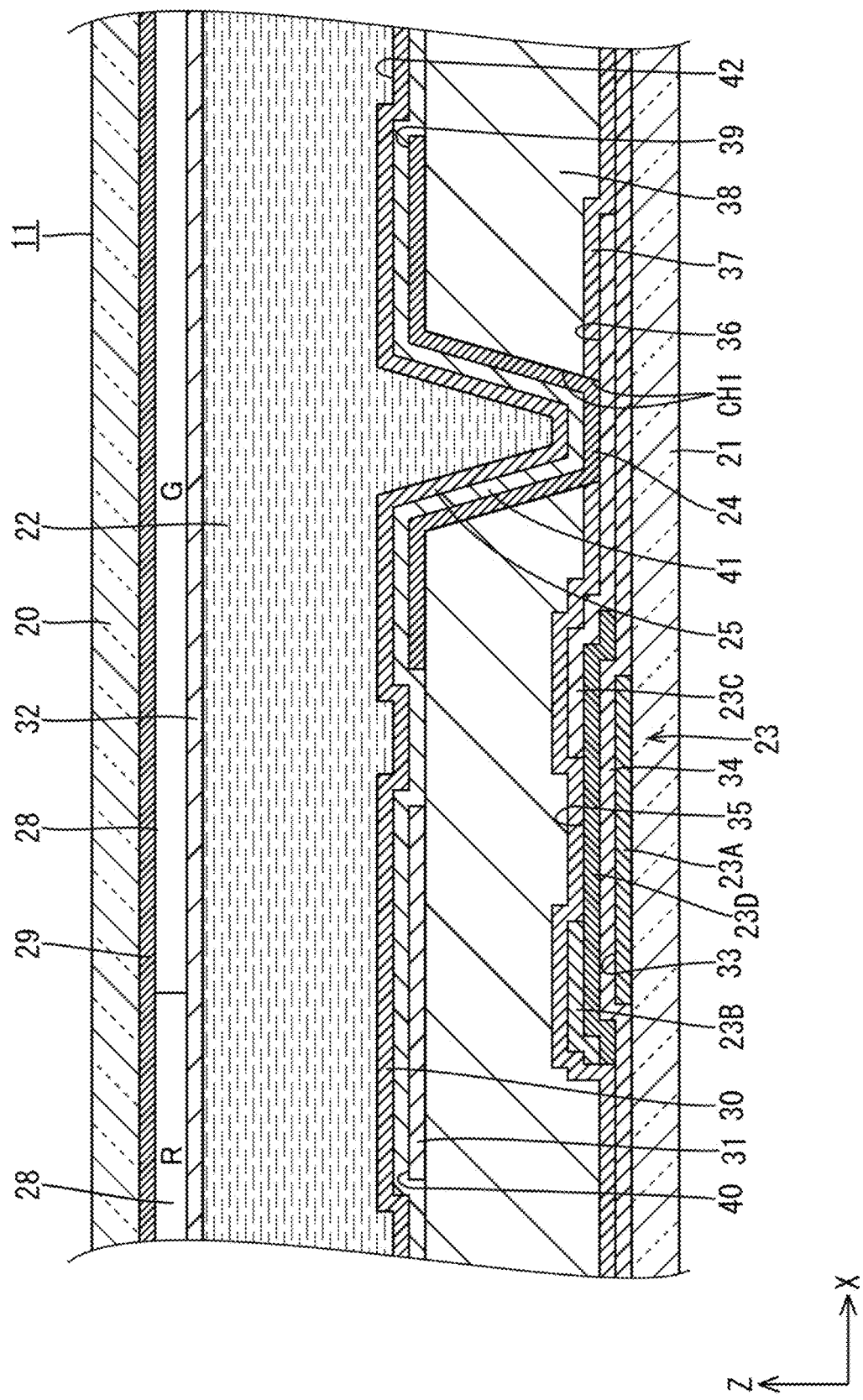
FIG. 4 is a cross-sectional view of the liquid crystal panel along line B-B in FIG. 2.

Various films stacked in layers on the inner surface side of the array substrate 21 will be described with reference to FIG. 4. FIG. 4 is a cross-sectional view of a section of the liquid crystal panel including the TFT 23. As illustrated in FIG. 4, on the array substrate 21, a first metal film 33, a gate insulator 34, a semiconductor film 35, a second metal film 36, a first interlayer insulator 37, a planarization film 38, a first transparent electrode film 39, a third metal film 40, a second interlayer insulator 41, and a second transparent electrode film 42 are stacked in layers in this sequence from a lower layer side on the array substrate 21. Each of the first metal film 33, the second metal film 36, and the third metal film 40 may be a single-layer film made of one kind of metal selected from copper, titanium, aluminum, molybdenum, and tungsten, a multi-layer film made of different kinds of metals, or an alloy to have conductivity and a light blocking property. The gate lines 26 and the gate electrodes 23A of the TFTs 23 may be prepared from the first metal film 33. The source lines 27 and the source electrodes 23B and the drain electrodes 23C of the TFTs 23 may be prepared from the second metal film 36. Large portions of the touch lines 31 may be prepared from the third metal film 40. The semiconductor film 35 may be a thin film made of a semiconductor material such as an oxide semiconductor material and an amorphous silicon material. The channels 23D of the TFTs 23 may be prepared from the semiconductor film 35. If the semiconductor film 35 is made of the oxide semiconductor material, the mobility in the channels 23D increases. Therefore, this configuration is preferable for reducing the TFTs 23 in size. The first transparent electrode film 39 and the second transparent electrode film 42 may be made of a transparent electrode material (e.g., indium tin oxide (ITO)) or indium zinc oxide (IZO). The pixel electrodes 24 may be prepared from the first transparent electrode film 39. The first transparent electrode film 39 and the third metal film 40 are disposed in the same layer upper than the first interlayer insulator 37. At least the common electrode 25 (the touch electrodes 30) is prepared from the second transparent electrode film 42. The large portions of the touch lines 31 are prepared from the third metal film 40, that is, have the single-layer structure in this embodiment. However, the touch lines 31 may be prepared from the first transparent electrode film 39 and the third metal film 40, that is, have a multi-layer structure.

Figure 5:
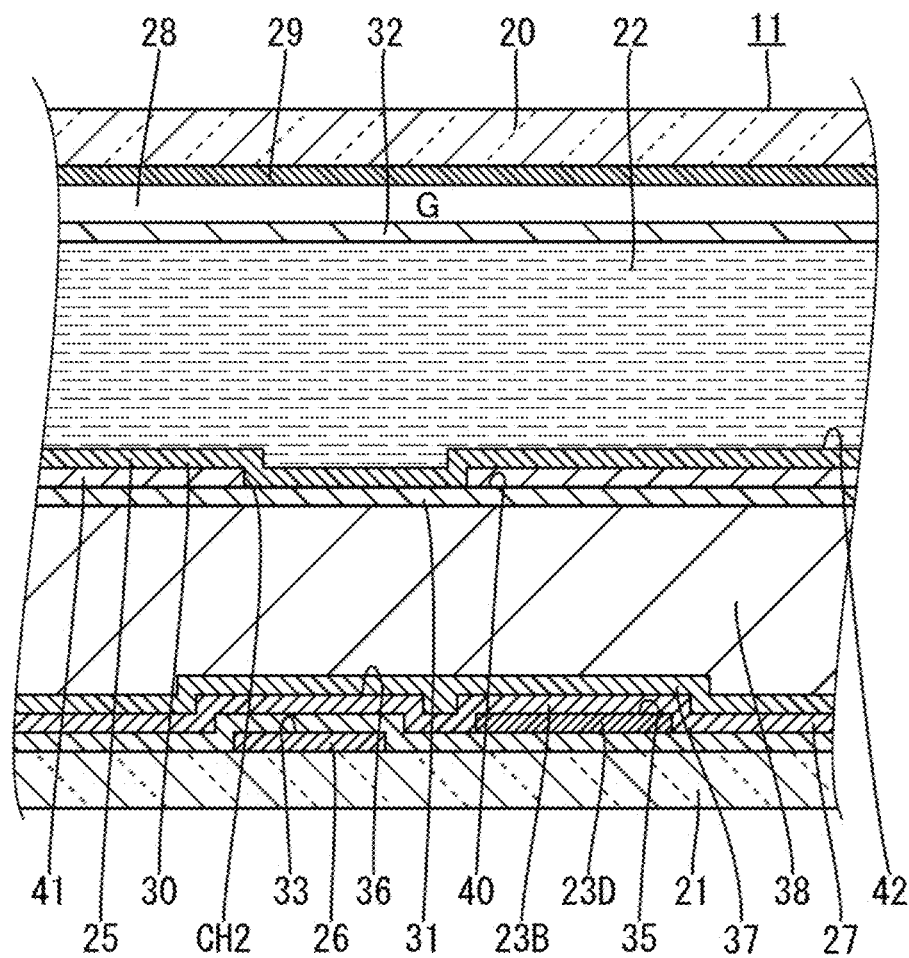
FIG. 5 is a cross-sectional view of the liquid crystal panel along line C-C in FIG. 2.

As illustrated in FIG. 4, the gate insulator 34, the first interlayer insulator 37, and the second interlayer insulator 41 are made of inorganic materials such as silicon nitride ($SiN_x$) and silicon oxide ($SiO_2$). The planarization film is made of an organic insulating material (an organic material) such as PMMA (an acrylic resin material). The thickness of the planarization film 38 is larger than the thicknesses of other insulators 34, 37, and 41 made of the inorganic materials. With the planarization film 38, a surface of the array substrate 21 is planarized. The gate insulator 34 insulates the first metal film 33 in the lower layer from the semiconductor film 35 and the second metal film 36 in the upper layers. Therefore, sections of the gate lines 26 prepared from the first metal film 33 and sections of the source lines 27 prepared from the second metal film 36 overlapping each other are electrically isolated from each other by the gate insulator 34. The first interlayer insulator 37 and the planarization film 38 insulate the semiconductor film 35 and the second metal film 36 in the lower layers from the first transparent electrode film 39 and the third metal film 40 in the upper layer. The first interlayer insulator 37 and the planarization film 38 are disposed between the source lines 27 prepared from the second metal film 36 and the touch lines 31 prepared from the third metal film 40. Although the source lines 27 and the touch lines 31 overlap each other, the source lines 27 and the touch lines 31 are electrically isolated from each other. Sections of the first interlayer insulator 37 and the planarization film 38 overlapping both the drain electrodes 23C of the TFTs 23 and the pixel electrodes 24 include pixel electrode contact holes CH1 for connecting the drain electrodes 23C to the pixel electrodes 24. The second interlayer insulator 41 insulates the first transparent electrode film 39 and the third metal film 40 in the lower layer from the second transparent electrode film 42 in the upper layer. Sections of the second interlayer insulator 41 overlapping both the touch lines 31 and the touch electrodes 30 to which the touch lines are connected include touch line contact holes CH2 for connecting the touch lines 31 to the touch electrodes 30 as illustrated in FIG. 5. FIG. 5 is a cross-sectional view of a section of the liquid crystal panel 11 including the touch line contact hole CH2.

Figure 6:
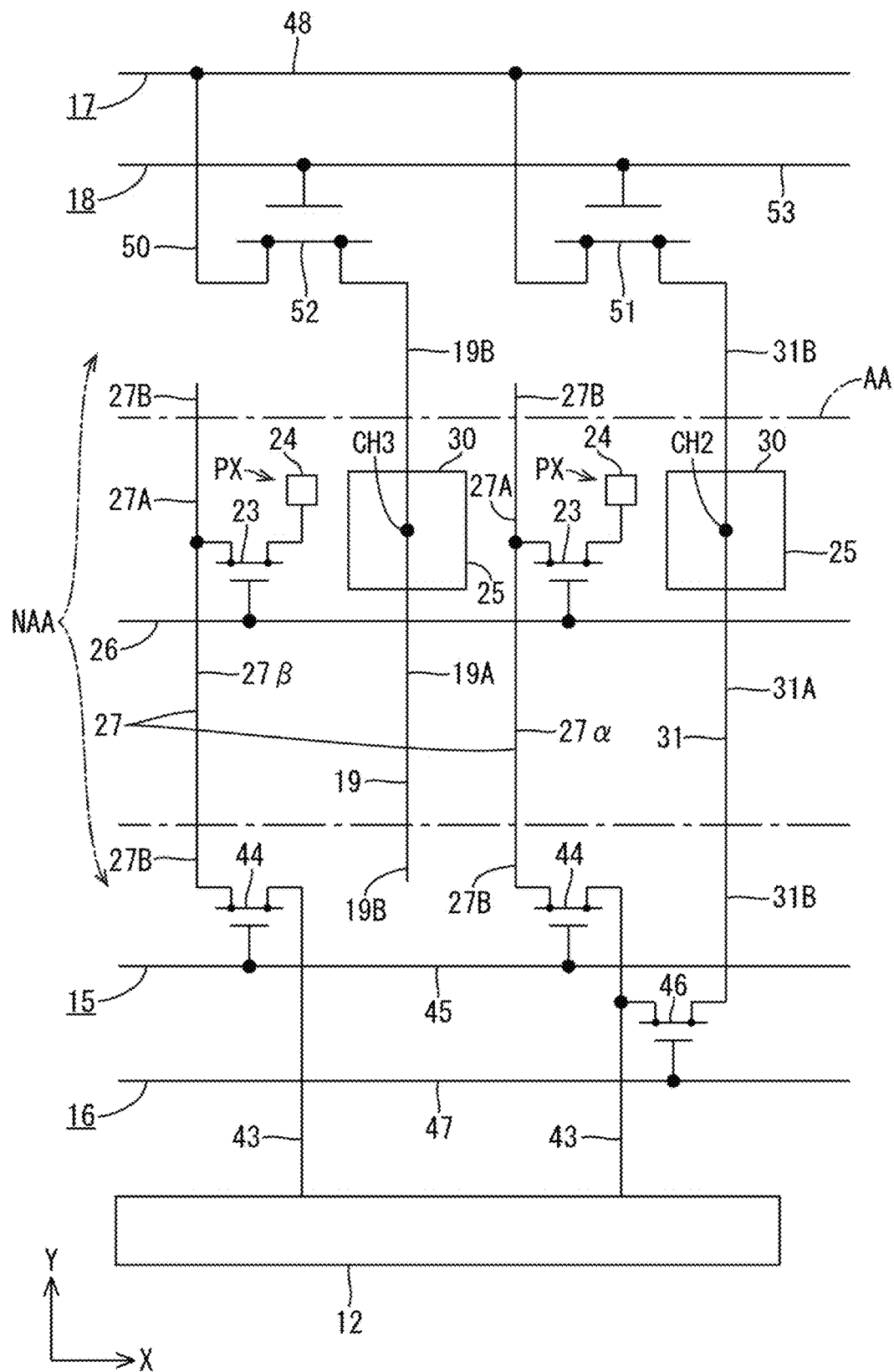
FIG. 6 is a circuit diagram illustrating an electrical configuration of an array substrate included in the liquid crystal panel.

Next, the first switch circuit 15, the second switch circuit 16, the common signal source 17, and the third switch circuit 18 will be described. FIG. 6 is a circuit diagram schematically illustrating an electric configuration of the array substrate 21. As illustrated in FIG. 6, the first switch circuit 15 is connected to the lead portions 27B of the source lines 27 on the driver 12 side in the Y-axis direction. The second switch circuit 16 is connected to the lead sections 31B of the touch lines 31 on the driver 12 side in the Y-axis direction. The first switch circuit and the second switch circuit 16 are connected to the driver 12 via connecting lines 43. The connecting lines 43 extend in the Y-axis direction to cross the first switch circuit 15 and the second switch circuit 16. The first switch circuit 15 and the second switch circuit 16 are configured to control start and stop of transmission of the signals supplied to the connecting lines 43 by the driver 12 to the source lines 27 and the touch lines 31 at predefined timings. Some of the connecting lines 43 are connected to the first switch circuit 15 and the second switch circuit 16. Some of the connecting lines 43 are connected to the first switch circuit 15 but not to the second switch circuit 16.

As illustrated in FIG. 6, the source lines 27 and the touch lines 31 connected to the same first connecting line 43α via the first switch circuit 15 and the second switch circuit 16 are disposed to overlap each other. Then number of the touch lines 31 is smaller than the number of the source lines 27. The source lines 27 include first source lines 27α (first image lines, first overlapping image lines) that overlap the touch lines 31 and second source lines 27β (second image lines, second overlapping image lines) that does not overlap the touch lines 31. The first source lines are indicated by reference sign 27α. The second source lines are indicated by reference sign 27β. The reference sign without the suffixes α and β will be used in descriptions of common structures and functions. The first source lines 27α are connected to the connecting lines 43 that are also connected to the second switch circuit 16. The first source lines 27α are connected via the first switch circuit 15. The second source lines 27β are connected to the connecting lines 43 that are not connected to the second switch circuit 16. The second source lines 27β are connected via the first switch circuit 15. Common lines 19 are disposed to overlap the second source lines 27β that do not overlap the touch lines 31. The common lines 19 are prepared from the third metal film 40 from which the touch lines 31 are prepared. In the display area AA, the common lines 19 and the touch lines 31 have substantially the same configuration (see FIG. 2). Namely, the common lines 19 extend in the Y-axis direction. The common lines 19 include trunk sections 19A and lead sections 19B. The trunk sections 19A are mostly disposed in the display area AA. Every two of the lead sections 19B are drawn from ends of each trunk section 19A disposed in the non-display area NAA. The common lines 19 are connected to the touch electrodes 30 (the common electrode 25) via common line contact holes CH3 formed in the second interlayer insulator 41. The common lines 19 transmit the common signals and thus the touch electrodes 30 (the common electrode 25) are held at the reference voltage based on the common signals. The number of the common lines 19 is equal to the number of the source lines 27 minus the number of the touch lines 31. All the source lines 27 overlap the touch lines 31 or the common lines 19. Because load capacitances of the source lines 27 are equalized and the common lines 19 are provided in the maximum number, the common signals are less likely to be rounded. The number of the first source lines 27α is equal to the number of the touch lines 31. The number of the second source lines 27β is equal to the number of the common lines 19. The touch lines 31 and the common lines 19 are disposed to overlap the first source lines 27α and the second source lines 27β for entire lengths of the first source lines 27α and the second source lines 27β, respectively, in the display area AA. Therefore, the load capacitances of the first source lines 27α and the second source lines 27β are equalized. The common signal source 17 is configured to perform feedings of the common signals. The third switch circuit 18 is connected to the lead sections 19B of the common lines 19 and the lead sections 31B of the touch lines 31 on the opposite side from the driver 12 in the Y-axis direction and to the common signal source 17. The third switch circuit 18 is configured to control start and stop of feedings of electric currents to the common signal source 17, the common lines 19, and the touch lines 31 at predefined timings.

Figure 7:
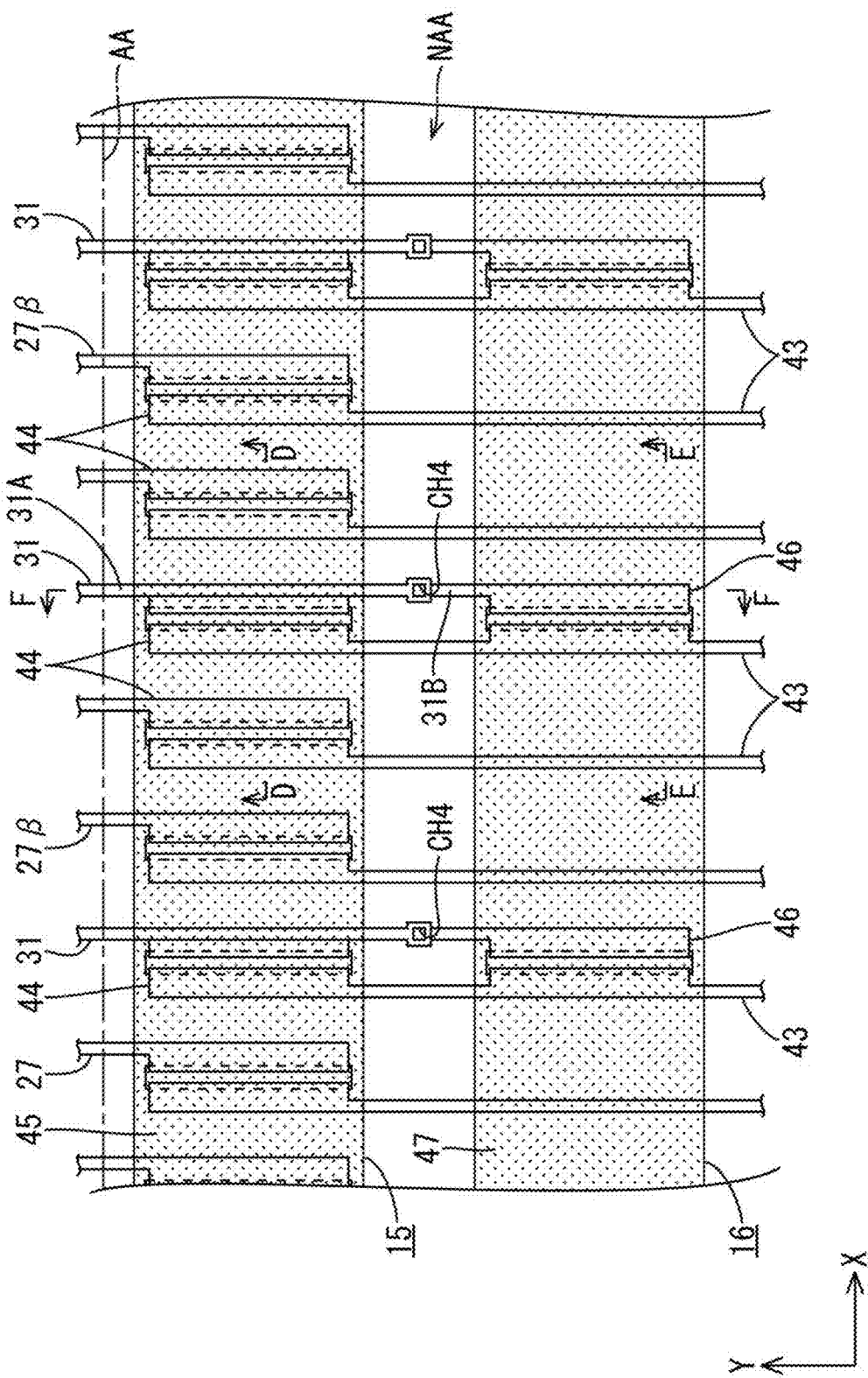
FIG. 7 is a cross-sectional view of the array substrate including a first switch circuit and a second switch circuit.

FIG. 7 is a plan view of a section of the array substrate including the first switch circuit 15 and the second switch circuit 16. In FIG. 7, an area in which the first metal film 33 is formed is indicated by hatching. As illustrated in FIG. 7, the first switch circuit 15 is disposed adjacent to the display area and closer to the display area AA relative to the second switch circuit 16. According to the configuration, the source lines 27 connected to the first switch circuit 15 do not cross the second switch circuit 16. Therefore, load capacitances of the source lines 27 are reduced and thus the image signals transmitted by the source lines 27 are less likely to be rounded. The first switch circuit 15 includes first switch components 44 and a first switch line 45. The first switch components 44 are connected to the source lines 27 and the connecting lines 43. The first switch line 45 is for control of driving of the first switch components 44. The first switch line 45 has a band shape linearly extending in the X-axis direction. The first switch line 45 is connected to the driver 12, the flexible substrate 13, or the gate circuits 14 via lines. The first switch line 45 receives signals for controlling the start and the stop of the feedings of currents to the first switch circuit 15. The first switch components 44 are arranged at intervals in a direction in which the first switch line 45 extends. The first switch components 44 are disposed to overlap the first switch line 45. The number of the first switch components 44 is equal to the number of the source lines 27. The first switch components 44 are collectively driven at a timing at which signals to start the feeding of the current to the first switch circuit 15 is supplied to the first switch line 45. The first switch circuit 15 is configured to start the feedings of the currents to the source lines 27 and the connecting lines 43 in synchronization with the feeding of the image signals to the connecting lines 43 by the driver 12.

As illustrated in FIG. 7, the second switch circuit 16 includes second switch components 46 and a second switch line 47. The second switch components 46 are connected to the touch lines 31 and the connecting lines 43. The second switch line 47 is for control of driving of the second switch components 46. The second switch line 47 has a band shape linearly extending in the X-axis direction. The second switch line 47 is connected to the driver 12, the flexible substrate 13, or the gate circuits 14 via lines. The second switch line 47 receives signals to control the start and the stop of the feeding of the current to the second switch circuit 16. The second switch components 46 are arranged at intervals in a direction in which the second switch line 47 extends. The second switch components 46 are disposed to overlap the second switch line 47. The number of the second switch components 46 is equal to the number of the touch lines 31. The interval between the second switch components 46 is larger than the interval between the first switch components 44. The second switch components 46 are collectively driven at a timing at which a signal to start the feeding of the current to the second switch circuit is supplied to the second switch line 47. The second switch circuit 16 is configured to start the feedings of the currents to the touch lines 31 and the connecting lines 43 in synchronization with the position detection by the driver 12.

Figure 8:
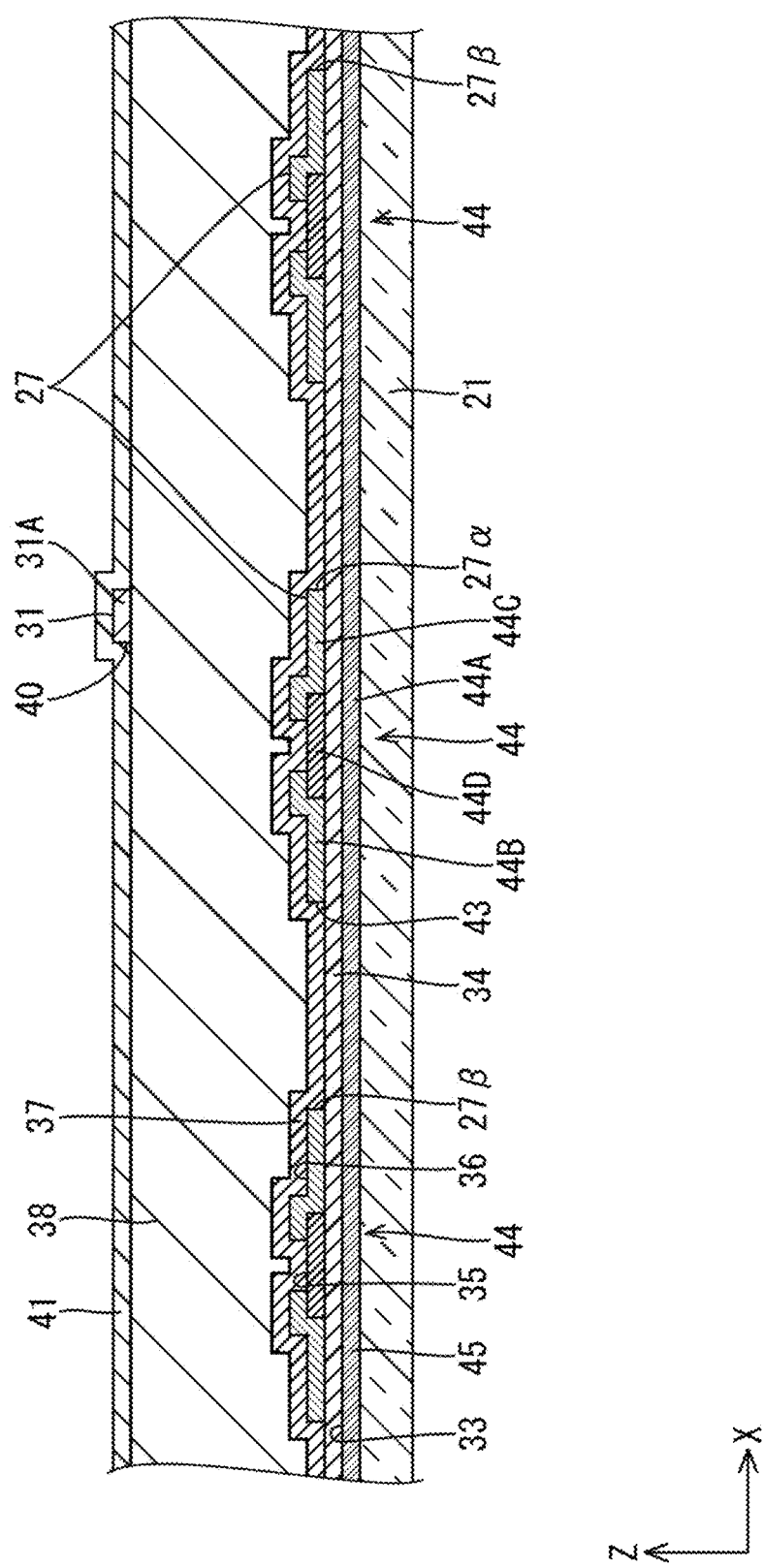
FIG. 8 is a cross-sectional view of the array substrate along line D-D in FIG. 7.

FIG. 8 is a cross-sectional view of the array substrate 21 cut at the first switch component 44. As illustrated in FIG. 8, the first switch components 44 include gate electrodes 44A, source electrodes 44B, drain electrodes 44C, and channels 44D. The gate electrodes 44A include sections of the first switch line 45. The source electrodes 44B include ends of the connecting lines 43. The drain electrodes 44C include lead portions 27B of the source lines 27. The drain electrodes 44C are separated from the source electrodes 44B in the X-axis direction. The channels 44D include first ends and second ends with respect to the X-axis direction. The first ends are connected to the source electrodes 44B. The second ends are connected to the drain electrodes 44C. The gate electrodes 44A and the first switch line 45 are prepared from the first metal film 33. The channels 44D are prepared from the semiconductor film 35. If an oxide semiconductor is used for a semiconductor material of the semiconductor film 35, mobility in the channels 44D improves. This configuration is preferable for reducing the first switch components 44 in size. The source electrodes 44B and the drain electrodes 44C are prepared from the second metal film 36. According to the configuration, when the signal for driving the first switch circuit 15 is supplied to the first switch line 45, the gate electrodes 44A are charged to the potentials based on the signal and the first switch components are driven. The source electrodes 44B and the drain electrodes 44C are electrically connected via the channels 44D. As a result, the connecting lines 43 and the source lines 27 are electrically connected. The timing at which the signal for driving the first switch circuit 15 is supplied to the first switch line 45 is in synchronization with the timing at which the image signals are supplied to the connecting lines 43 by the driver 12. Therefore, the image signals output from the driver 12 are supplied to the source lines 27 via the connecting lines 43 and the first switch components 44.

Figure 9:
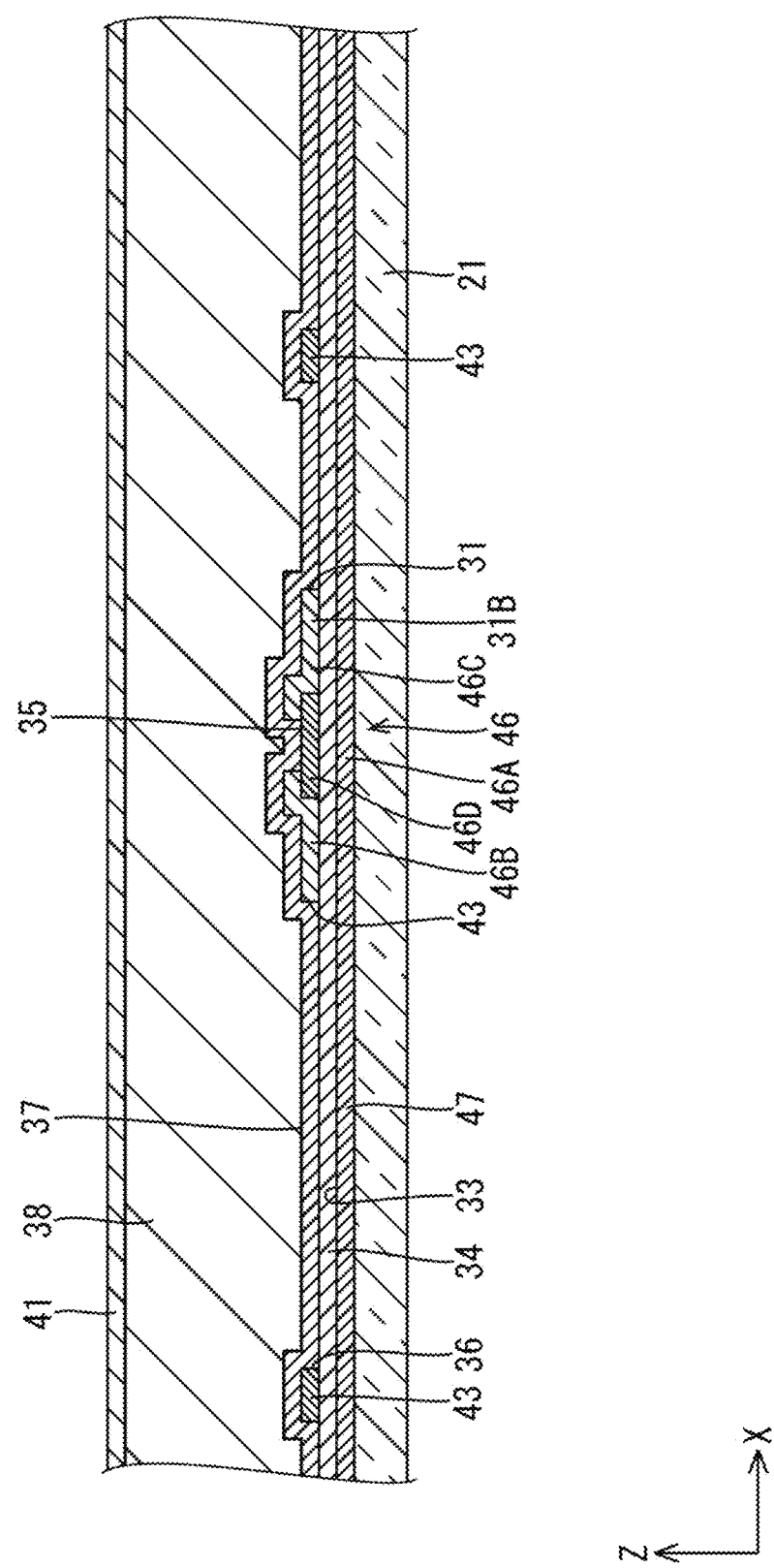
FIG. 9 is a cross-sectional view of the array substrate along line E-E in FIG. 7.
Figure 10:
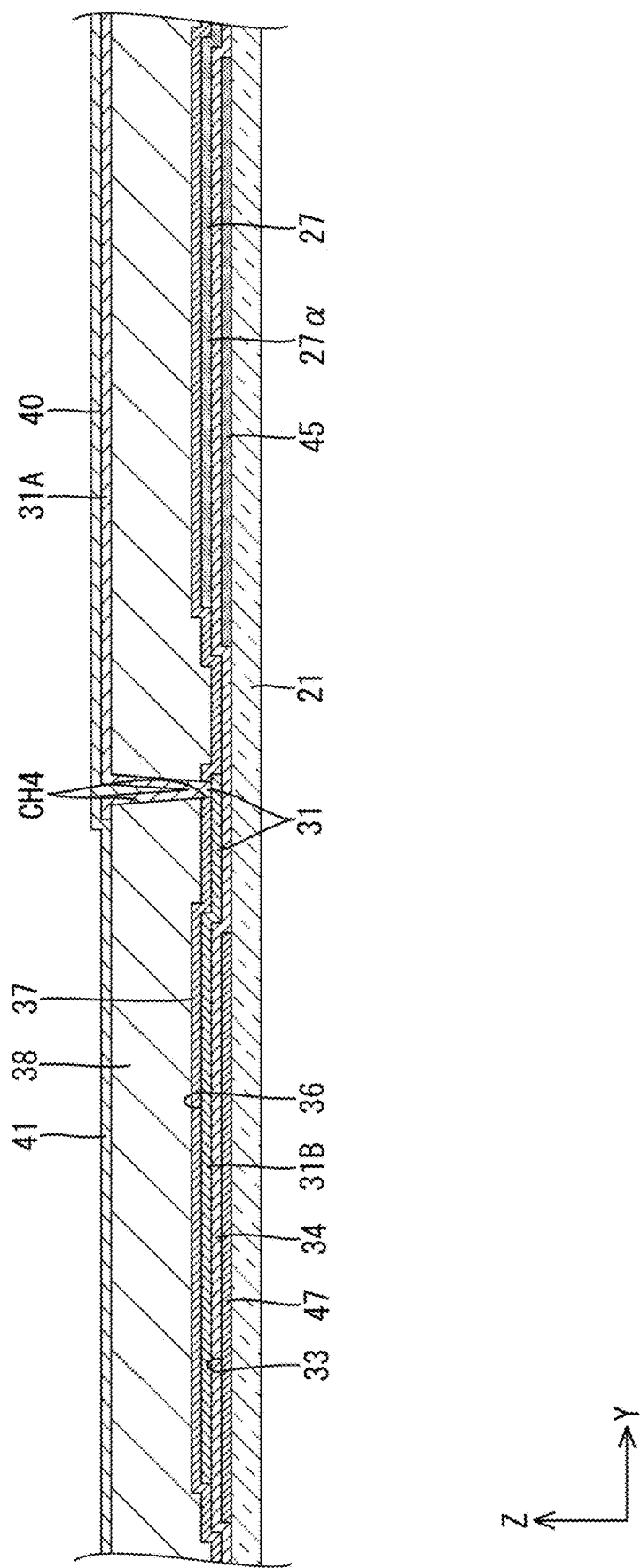
FIG. 10 is a cross-sectional view of the array substrate along line F-F in FIG. 7.

FIG. 9 is a cross-sectional view of the array substrate 21 cut at the second switch component 46. FIG. 10 is a cross-sectional view of a section of the array substrate 21 including the touch line 31 and the connecting line 43. As illustrated in FIG. 9, the second switch components 46 include gate electrodes 46A, source electrodes 46B, drain electrodes 46C, and channels 46D. The gate electrodes 46A include sections of the second switch line 47. The source electrodes 46B include sections of the connecting lines 43. The drain electrodes 46C include the lead sections 31B of the touch lines. The drain electrodes 46C are separated from the source electrodes 46B in the X-axis direction. The channels 46D include first ends and second ends with respect to the X-axis direction. The first ends are connected to the source electrodes 46B. The second ends are connected to the drain electrodes 46C. The gate electrodes 46A and the second switch line 47 are prepared from the first metal film 33. The channels 46D are prepared from the semiconductor film 35. If the oxide semiconductor is used for the semiconductor material of the semiconductor film 35, the mobility in the channels 46D improves. This configuration is preferable for reducing the second switch components 46 in size. The source electrodes 46B and the drain electrodes 46C are prepared from the second metal film 36. The trunk sections 31A of the touch lines 31 connected to the second switch components 46 are prepared from the third metal film 40. As illustrated in FIGS. 9 and 10, the lead sections 31B (including the drain electrodes 46C of the second switch components 46) are prepared from the second metal film 36. The trunk sections 31A and the lead sections 31B of the touch lines 31 are disposed such that the ends thereof overlap each other. The sections of the ends overlapping each other are connected to each other via lead contact holes CH4 formed in the first interlayer insulator 37 and the planarization film 38 that are disposed therebetween. According to the configuration, when the signal for turning on the second switch circuit 16 is supplied to the second switch line 47, the gate electrodes 46A are charged to potentials based on the signal and the second switching components 46 are driven. The source electrodes 46B and the drain electrodes 46C are electrically connected via the channels 46D. As a result, the connecting lines 43 and the touch lines 31 are electrically connected. The timing at which the signal for turning on the second switch circuit 16 is supplied to the second switch line 47 is in synchronization with the position detection by the driver 12. If a capacitance at the touch electrode 30 varies when the finger approaches the touch electrode 30, the variation in capacitance is detected by the driver 12 via the touch line 31, the second switch component 46, and the connecting line 43.

Figure 11:
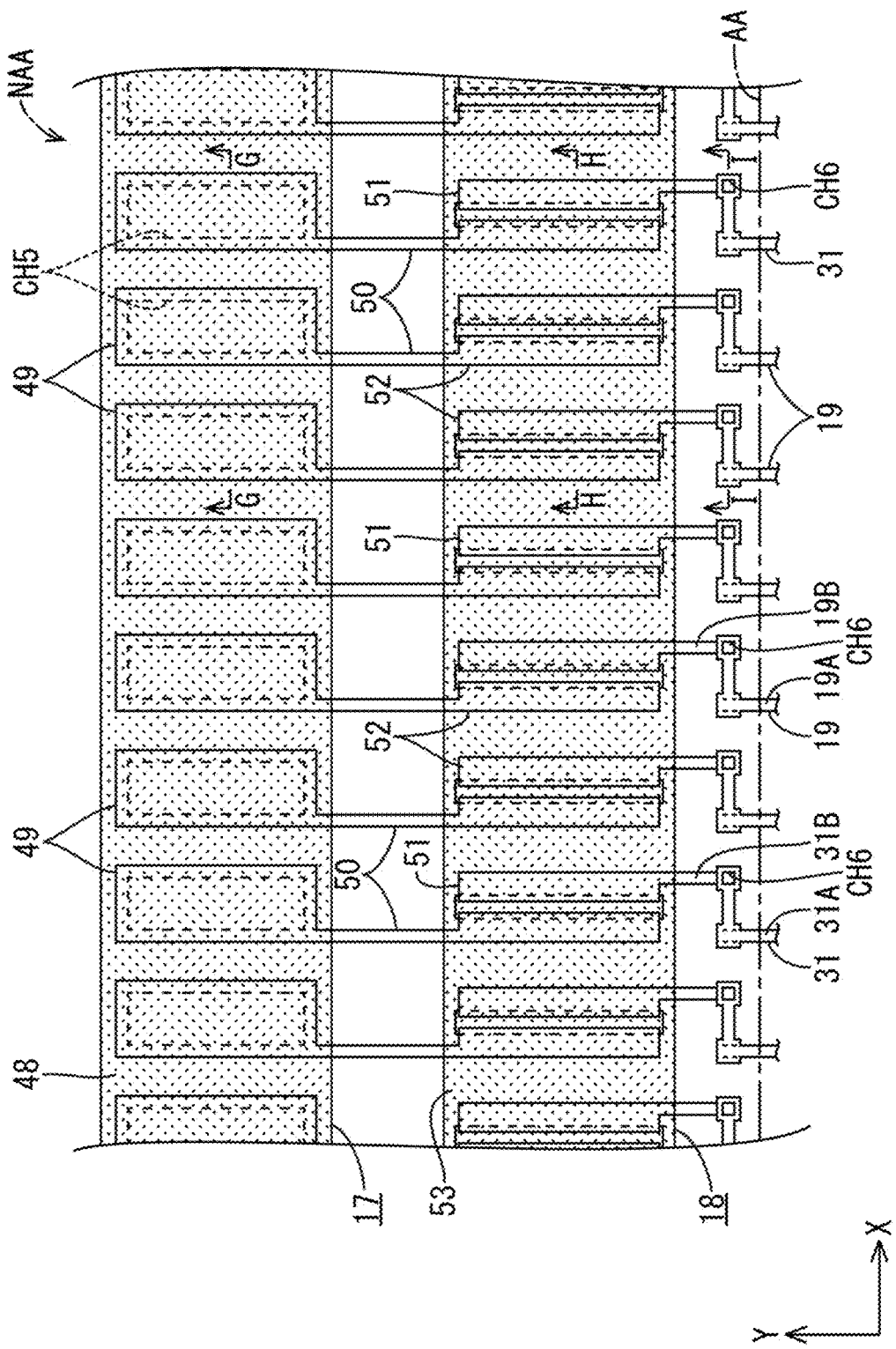
FIG. 11 is a plan view of a section of the array substrate including a common signal source and a third switch circuit.
Figure 12:
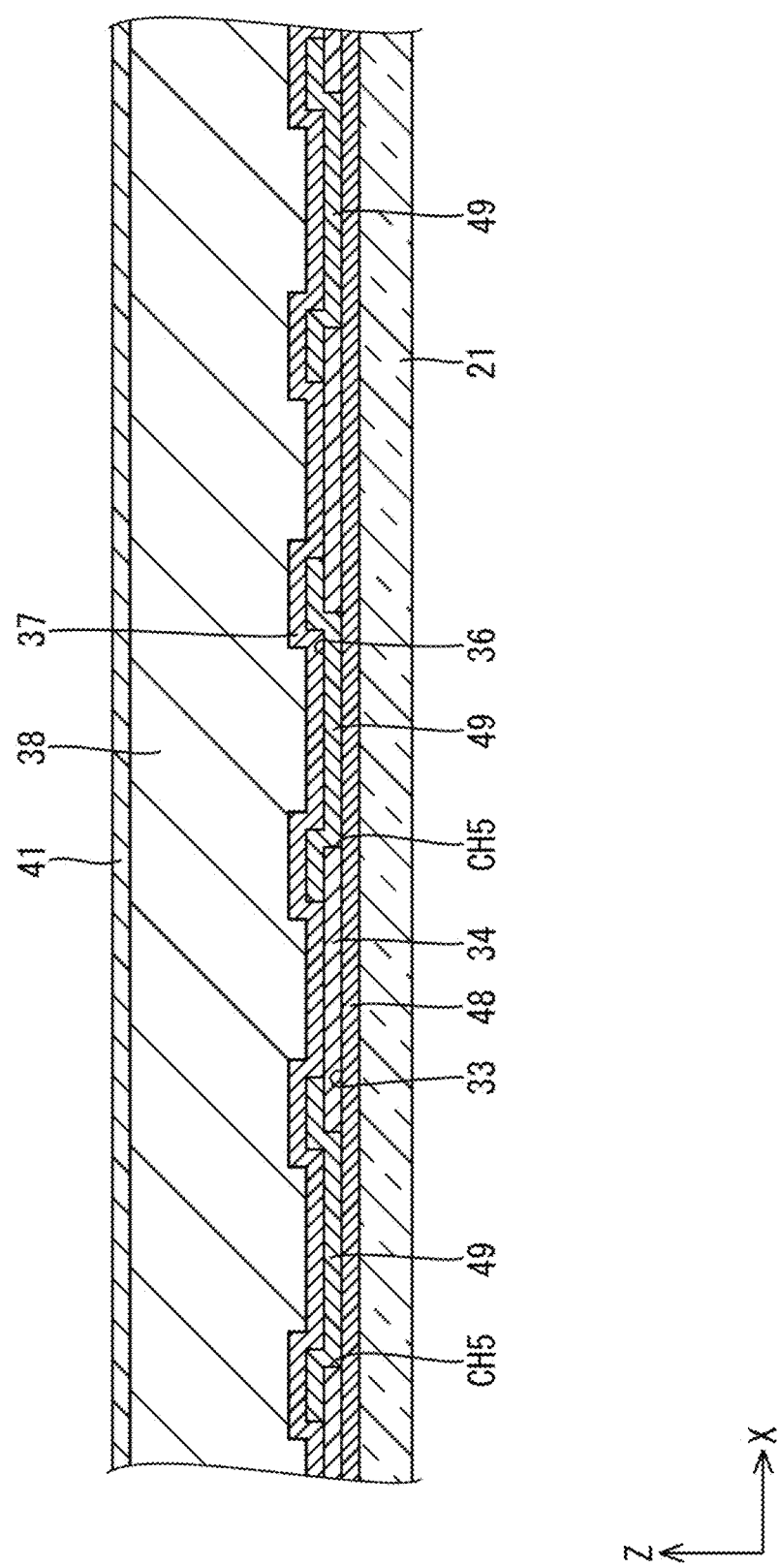
FIG. 12 is a cross-sectional view of the array substrate along line G-G in FIG. 11.

FIG. 11 is a plan view of a section of the array substrate 21 including the common signal source 17 and the third switch circuit 18. In FIG. 11, an area in which the first metal film 33 is formed is indicated by hatching. As illustrated in FIG. 11, the third switch circuit 18 is disposed adjacent to the display area AA and closer to the display area AA relative to the common signal source 17. In comparison to a configuration in which the common signal source is disposed closer to the display area AA relative to the third switch circuit 18, lengths of sections of the common lines 19 and the touch lines 31 connected to the third switch circuit 18 can be reduced. According to the configuration, the signals (the common signals) transmitted to the common lines 19 and the touch lines 31 are less likely to be rounded. The common signal source 17 includes a common trunk line 48 and common connecting electrodes 49. The common signals are transmitted through the common trunk line 48. The common connecting electrodes 49 are connected to the common trunk line 48. The common trunk line 48 has a band shape linearly extending in the X-axis direction. The common trunk line 48 is connected to the driver 12, the flexible substrate 13, or the gate circuits 14 via lines. The common trunk line 48 receives the common signals. The common connecting electrodes 49 are arranged at intervals in a direction in which the common trunk line 48 extends. The common connecting electrodes 49 are disposed to overlap the common trunk line 48. The number of the common connecting electrodes 49 is equal to a total number of the common lines 19 and the touch lines 31 (the number of the source lines 27). FIG. 12 is a cross-sectional view of a section of the array substrate 21 including the common signal source 17. As illustrated in FIG. 12, the common trunk line 48 is prepared from the first metal film 33 and the common connecting electrodes 49 are prepared from the second metal film 36. Sections of the common trunk line 48 and the common connecting electrodes 49 overlapping each other are connected to each other via common trunk line contact holes CH5 formed in the gate insulator 34 disposed between the first metal film 33 and the second metal film 36. First ends of common connecting lines 50 are connected to the common connecting electrodes 49. The common connecting lines 50 are prepared from the second metal film 36 from which the common connecting electrodes 49 are prepared. The common connecting lines 50 extend in the Y-axis direction. Second ends of the common connecting lines 50 are connected to the third switch circuit 18, which will be described next.

As illustrated in FIG. 11, the third switch circuit 18 includes first common switch components 51, second common switch components 52, and a common switch line 53. The first common switch components 51 are connected to the common signal source 17 and the touch lines 31. The second common switch components 52 are connected to the common signal source 17 and the common lines 19. The common switch line 53 is for control of driving of the first common switch components 51 and the second common switch components 52. The common switch line 53 has a band shape linearly extending in the X-axis direction. The common switch line 53 is connected to the driver 12, the flexible substrate 13, or the gate circuits 14 via lines. The common switch line 53 receives the signals for turning on or off the third switch circuit 18. The first common switch components 51 and the second common switch components 52 are arranged at intervals in a direction in which the common switch line 53 extends. The first common switch components 51 and the second common switch components 52 are disposed to overlap the common switch line 53. The number of the common switch components 51 or the second common switch components 52 is equal to the total number of the common lines 19 and the touch lines 31 (the number of the source lines 27). The first common switch components 51 and the second common switch components 52 are collectively driven at a timing at which the signal for turning on the third switch circuit 18 is supplied to the common switch line 53. The third switch circuit 18 is configured to electrically connect the common signal source 17 to the common lines 19 and the touch lines 31.

Figure 13:
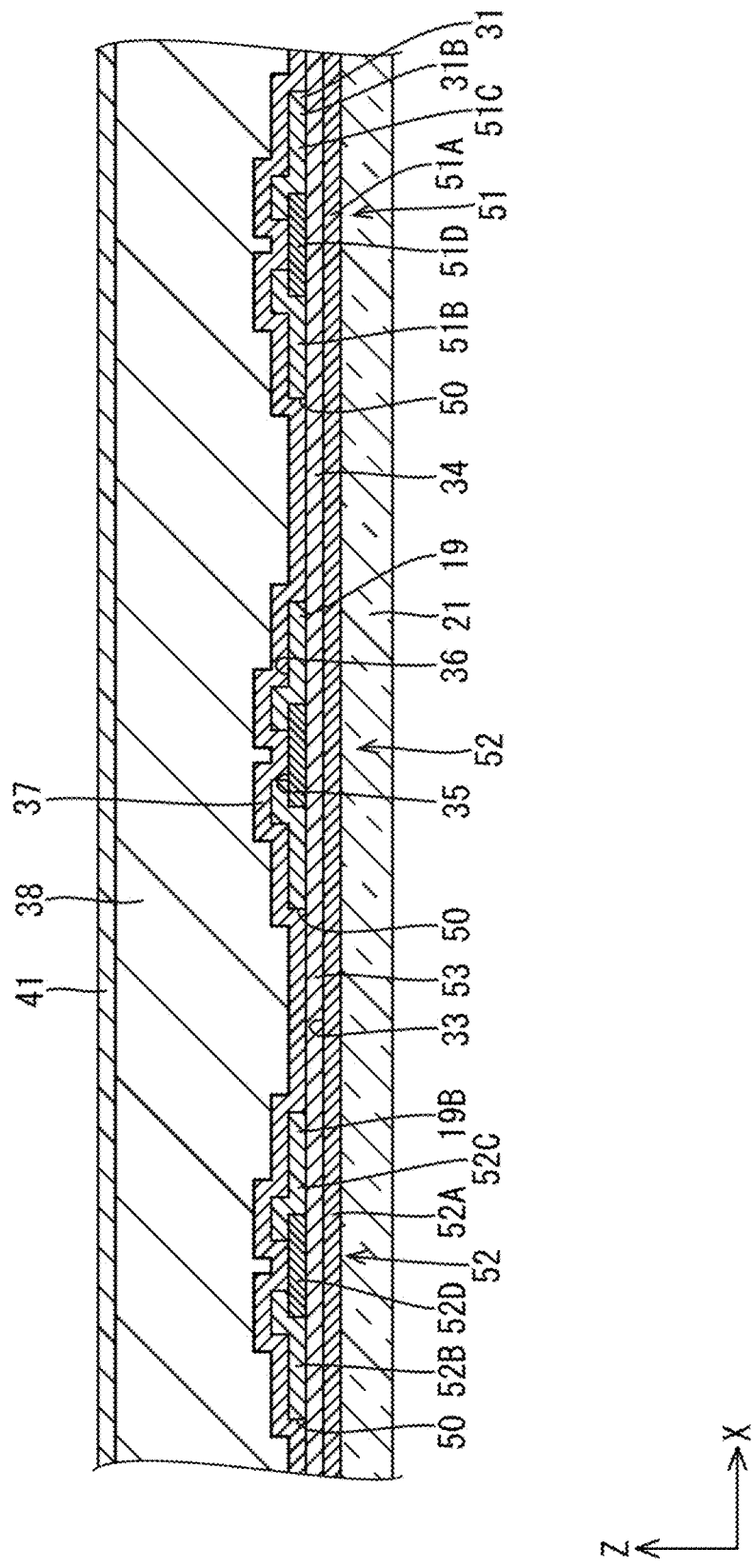
FIG. 13 is a cross-sectional view of the array substrate along line H-H in FIG. 11.
Figure 14:
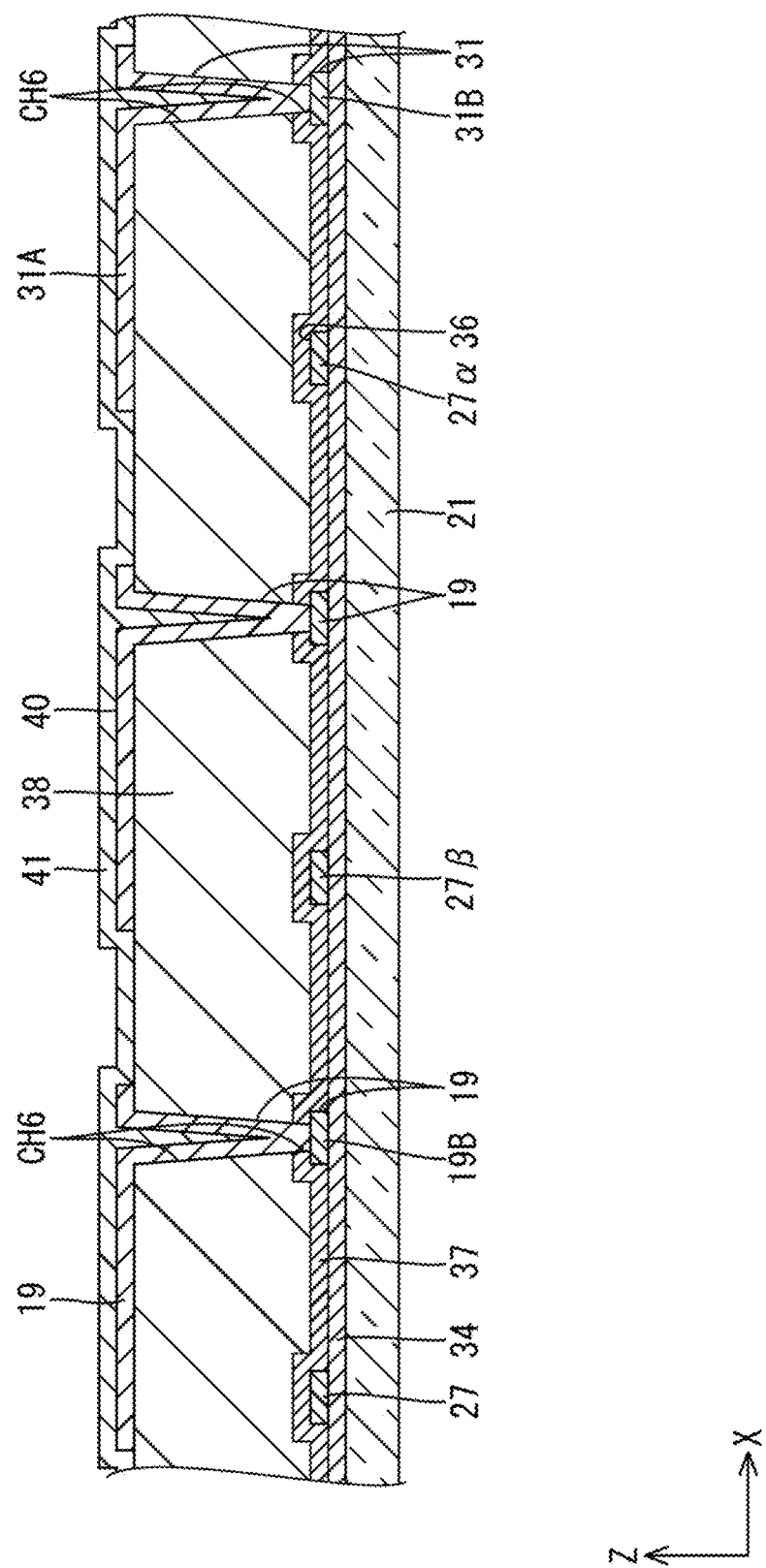
FIG. 14 is a cross-sectional view of the array substrate along line I-I in FIG. 11.

FIG. 13 is a cross-sectional view of the array substrate 21 cut at the first common switch component 51 and the second common switch component 52. As illustrated in FIGS. 11 and 13, the first common switch components 51 include gate electrodes 51A, source electrodes 51B, drain electrodes 51C, and channels 51D. The second common switch components 52 include gate electrodes 52A, source electrodes 52B, drain electrodes 52C, and channels 52D. The gate electrodes 51A and 52A include sections of the common switch line 53. The source electrodes 51B and 52B include ends of the common connecting lines 50. The drain electrodes 51C and 52C are separated from the source electrodes 51B and 52B in the X-axis direction. The channels 51D include first ends connected to the source electrodes 51B and second ends connected to the drain electrodes 51C with respect to the X-axis direction. The channels 52D include first ends connected to the source electrodes 52B and second ends connected to the drain electrodes 52C with respect to the X-axis direction. The drain electrodes 51C of the first common switch components 51 include the lead sections 31B of the touch lines 31 on the opposite side from the driver 12. The drain electrodes 52C of the second common switch components 52 include the lead sections 19B of the common lines 19 on the opposite side from the driver 12. The gate electrodes 51A and 52A and the common switch line 53 are prepared from the first metal film 33. The channels 51D and 52D are prepared from the semiconductor film 35. If the oxide semiconductor is used for the semiconductor material of the semiconductor film 35, the mobility in the channels 51D and 52D improves. This configuration is preferable for reducing the common switch components 51 and 52 in size. The source electrodes 51B and 52B and the drain electrodes 51C and 52C are prepared from the second metal film 36. FIG. 14 is a cross-sectional view of a section of the array substrate including the common lines 19 and the touch lines 31. The trunk sections 19A of the common lines 19 and the trunk sections 31A of the touch lines 31 are prepared from the third metal film 40. As illustrated in FIGS. 11 and 14, the lead sections 19B and 31B (including the drain electrodes 51C of the first common switch components 51 and the drain electrodes 52C of the second common switch components 52) are prepared from the second metal film 36. The trunk sections 19A and the lead sections 19B of the common lines 19 are disposed to overlap each other. The trunk sections 31A and the lead sections 31B of the touch lines 31 are disposed to overlap each other. The overlapping sections are connected to each other via lead section contact holes CH6 formed in the first interlayer insulator 37 and the planarization film 38 disposed therebetween. According to the configuration, when the signal for turning on the third switch circuit 18 is supplied to the common switch line 53, the gate electrodes 51A and 52A are charged to potentials based on the signal and the first common switch components 51 and the second common switch components 52 are driven. The source electrodes 51B and the drain electrodes 51C are electrically connected via the channels 51D. The source electrodes 52B and the drain electrodes 52C are electrically connected via the channels 52D. As a result, the common signal source 17 is electrically connected to the common lines 19 and the touch lines 31. The common signals supplied by the common signal source 17 are transmitted to the common lines 19 and the touch lines 31. The touch electrodes 30 disposed in the display area AA are charged to the reference potential based on the common signals.

This embodiment has the configuration described above. Next, functions and operations of this embodiment will be described. The liquid crystal display device 10 has the input position detecting function in addition to the display function as described above. To perform these functions, the liquid crystal display device 10 is operated as described below. As illustrated in FIG. 6, the driver 12 included in the liquid crystal panel 11 is configured to perform the feedings of the image signals to the connecting lines 43 during the display period to perform the display function. The driver 12 is configured to detect the capacitances at the touch electrodes 30 via the connecting lines 43 during the sensing period to perform the input position detecting function.

As illustrated in FIG. 6, the signals to turn on the first switch circuit 15 are supplied to the first switch line 45 in the first switch circuit 15 in synchronization with the feedings of the image signals to the connecting lines 43 by the driver 12 during the display periods. Furthermore, the signals to turn off the second switch circuit 16 are supplied to the second switch line 47 in the second switch circuit 16 in synchronization with the feedings of the image signals to the connecting lines 43 by the driver 12 during the display periods. Still furthermore, the signals to turn on the third switch circuit 18 are supplied to the common switch line 53 in the third switch circuit 18 in synchronization with the feedings of the image signals to the connecting lines 43 by the driver 12 during the display periods. The first switch components 44 in the first switch circuit 15 are driven and the image signals supplied to the connecting lines 43 by the driver 12 are transmitted to the source lines 27. The common switch components 51 and 52 in the third switch circuit 18 are driven and thus the common signals supplied by the common signal source 17 are transmitted to the common lines 19 and the touch lines 31. The TFTs 23 are turned on (driven) based on the scanning signals supplied to the gate lines 26 by the gate circuits 14. Therefore, the pixel electrodes 24 are charged to potentials based on the image signals transmitted through the source lines 27. The touch electrodes 30 connected to the common lines 19 and the touch lines 31 are charged to the reference potential based on the common signals and function as the common electrode 25. According to the configuration, the orientation of the liquid crystal molecules included in the liquid crystal layer 22 is controlled for every group of the pixels PX and specified images are displayed in the display area AA.

As illustrated in FIG. 6, the signals to turn on the second switch circuit 16 are supplied to the second switch components 46 in the second switch circuit 16 during the sensing periods. Furthermore, the signals to turn off the first switch circuit 15 are supplied to the first switch components 44 in the first switch circuit 15 during the sensing periods. Still furthermore, the signals to turn off the third switch circuit 18 are supplied to the common switch line 53 in the third switch circuit 18 during the sensing periods. The second switch components 46 in the second switch circuit 16 are driven. As a result, the touch lines 31 and the connecting lines 43 are electrically connected. If the finger approaches one of the touch electrodes 30, the variation in capacitance at the touch electrode adjacent to the finger is detected by the driver 12 via the touch lines connected to the touch electrode 30 and the connecting line 43 electrically connected to the connecting line 43.

A period required for charging all the pixels PX for displaying a single image in the display area AA of the liquid crystal panel 11 is referred to as a "one-frame display period." In the one-frame display period, the scanning signals are supplied to all the gate lines 26 in sequence and the image signals are supplied to all the source lines 27 by the driver 12. In this embodiment, the driver 12 performs the feeding of the common signal at least once. In synchronization with the feeding of the common signal by the driver 12, the signal to turn on the second switch circuit 16 is supplied to the second switch line 47 in the second switch circuit 16. As a result, the touch line 31 and the driver 12 are electrically connected. At this time, the first switch circuit 15 is not turned on and thus the common signal supplied to the connecting line 43 by the driver 12 is transmitted to the touch line 31 via the second switch circuit 16. In synchronization with the feeding of the common signal by the driver 12, the signal to turn on the third switch circuit 18 is supplied to the common switch line 53 in the third switch circuit 18. As a result, the common line 19 and the touch line 31 are electrically connected to the common signal source 17. During the one-frame display period, the common signals are supplied to the touch line 31 by the driver 12 and the common signal source 17 at least once. Therefore, the common signals transmitted through the common line 19 and the touch line 31 are less likely to be rounded due to the line resistances of the common line 19 and the touch line 31. This configuration is preferable for increasing the liquid crystal display device 10 in size.

As described above, the liquid crystal display device 10 (the display device) according to this embodiment includes the source lines 27 (the image lines), the touch lines (the position detecting lines), the driver 12 (the signal processor), the first switch circuit 15, the second switch circuit 16, the common signal source 17, and the third switch circuit 18. The source lines 27 are disposed in the display area AA in which the images are displayed. The touch lines 31 are disposed in the display area AA. The driver 12 is disposed in the display area AA and configured to the feedings of the image signals and the position detection with time-division. The first switch circuit 15 is disposed on the driver 12 side relative to the display area AA outside the display area AA and connected to the source lines 27 and the driver 12. The first switch circuit 15 is configured to electrically connect the source lines 27 to the driver 12 in synchronization with the feedings of the image signals by the driver 12. The second switch circuit 16 is disposed on the driver 12 side relative to the display area AA outside the display area AA and connected to the touch lines 31 and the driver 12. The second switch circuit 16 is configured to electrically connect the touch lines 31 to the driver 12 in synchronization with the position detection by the driver 12. The common signal source 17 is disposed on the opposite side from the driver 12 relative to the display area AA outside the display area AA. The common signal source 17 is configured to perform the feedings of the common signals. The third switch circuit 18 is disposed on the opposite side from the driver 12 relative to the display area AA outside the display area AA. The common signal source 17 is connected to the touch lines 31 and the common signal source 17 and configured to electrically connect the touch lines 31 to the common signal source 17 in synchronization with the feedings of the image signals by the driver 12.

According to the configuration, when the source lines 27 and the driver 12 are electrically connected by the first switch circuit 15 in synchronization with the feedings of the image signals by the driver 12 disposed in the display area AA, the image signals are supplied to the source lines 27 in the display area AA. When the touch lines 31 and the common signal source 17 are electrically connected by the third switch circuit 18 in synchronization with the feedings of the image signals by the driver 12, the common signals are supplied to the touch lines 31. When the touch lines 31 and the driver 12 are electrically connected by the second switch circuit 16 in synchronization with the position detection by the driver 12, the positions are detected by the driver 12 via the touch lines 31 disposed in the display area AA. The first switch circuit 15 and the second switch circuit 16 are disposed on the driver 12 side relative to the display area AA. The common signal source 17 and the third switch circuit 18 are disposed on the opposite side from the driver 12 relative to the display area AA. In comparison to the conventional configuration in which the source line selecting circuit, the switch circuit, and the VCOM switch circuit are disposed on the selector side relative to the display circuit, the width of the section of the frame on the driver 12 side relative to the display area AA can be reduced.

The driver 12 is configured to perform the feedings of the common signals during the one-frame display periods in which the images are displayed in the display area AA. The second switch circuit 16 is configured to electrically connect the touch lines 31 to the driver 12 in synchronization with the feedings of the common signals by the driver 12. The third switch circuit 18 is configured to electrically connect the touch lines 31 to the common signal source 17 in synchronization with the feedings of the common signals by the driver 12. In synchronization with the feedings of the common signals by the driver 12, the touch lines 31 and the driver 12 are electrically connected by the second switch circuit 16 and the touch lines 31 and the common signal source 17 are electrically connected by the third switch circuit 18 during the one-frame display periods. The common signals are supplied to the touch lines 31 by the driver 12 via the second switch circuit 16. The common signals are supplied to the touch lines 31 by the common signal source 17 via the third switch circuit 18. The common signals transmitted through the touch lines 31 are less likely to be rounded due to the line resistances of the touch lines 31.

The first switch circuit 15 is disposed closer to the display area AA relative to the second switch circuit 16. According to the configuration, the source lines 27 that are electrically connected to the driver 12 by the first switch circuit 15 do not cross the second switch circuit 16. Therefore, the load capacitances of the source lines 27 are reduced and thus the image signals transmitted by the source lines 27 are less likely to be rounded.

The connecting lines 43 are drawn from the driver 12 and connected to the first switch circuit 15 and the second switch circuit 16. The source lines 27 and the touch lines 31 are provided. The first switch circuit 15 includes the first switch components 44 connected to the source lines 27 and the connecting lines 43. The second switch circuit 16 includes the second switch components 46 connected to the touch lines 31 and the connecting lines 43. When the connecting lines 43 and the source lines 27 are electrically connected by the first switch components 44 in synchronization with the feedings of the image signals by the driver 12, the image signals are supplied to the source lines. When the connecting lines 43 and the touch lines 31 are electrically connected by the second switch components 46 in synchronization with the position detection by the driver 12, the positions are detected by the driver 12 via the connecting lines 43 and the touch lines 31.

The common lines 19 are disposed in the display area AA and connected to the third switch circuit 18. The third switch circuit 18 is configured to electrically connect the common signal source 17 to the common lines 19 in synchronization with the feedings of the image signals by the driver 12. According to the configuration, the common signals supplied by the common signal source 17 are transmitted to the touch lines 31 and the common lines 19 by the third switch circuit 18. Therefore, the common signals are less likely to be rounded.

The number of the touch lines 31 is smaller than the number of the source lines 27. The touch lines 31 are disposed in the layer in which the common lines 19 are disposed. The source lines 27 include the first source lines $27\alpha$ (the first overlapping image lines) and the second source lines $27\beta$ (the second overlapping image lines). The first source lines $27\alpha$ are disposed to overlap the touch lines 31 vial the first interlayer insulator 37 and the planarization film 38 that are the insulators. The second source lines $27\beta$ are disposed to overlap the common lines 19 via the first interlayer insulator and the planarization film 38 that are insulators. Because the number of the touch lines 31 is smaller than the number of the source lines 27, the common lines 19 overlap the second source lines $27\beta$ via the first interlayer insulator 37 and the planarization film 38 that are the insulators. The touch lines 31 provided in the number smaller than the number of the source lines 27 are disposed to overlap the first source lines $27\alpha$ via the first interlayer insulator 37 and the planarization film 38 that are the insulators. The lines 19, 27 and 31 are efficiently arranged in the display area AA and the non-display area NAA. This configuration is preferable for improving the brightness of the images displayed in the display area AA and the definition.

The first source lines $27\alpha$ and the second source lines $27\beta$ are connected to the first switch circuit 15. If the second source lines $27\beta$ are directly connected the driver 12 without the first switch circuit 15, the image signal can be supplied to the second source lines $27\beta$ by the driver 12. However, the line resistances may differ from the line resistances that may measure when the image signals are supplied to the first source lines $27\alpha$ by the driver 12 via the first switch circuit 15. The first source lines $27\alpha$ and the second source lines $27\beta$ are connected to the first switch circuit 15. Therefore, the image signals supplied to the first source lines $27\alpha$ and the second source lines $27\beta$ by the driver 12 via the first switch circuit 15. Therefore, the differences in line resistance are less likely to be created.

The number of the first source lines $27\alpha$ is equal to the number of the touch lines 31. The number of the second source lines $27\beta$ is equal to the number of the common lines 19. According to the configuration, the touch lines 31 or the common lines 19 overlap all the source lines 27. Therefore, the load capacitances of the source lines are equalized. The common lines 19 are provided in the maximum number while the lines 19, 27 and 31 are efficiently arranged in the display area AA. Therefore, the common signals are less likely to be rounded.

The touch lines 31 and the common lines 19 are disposed to overlap the first source lines $27\alpha$ and the second source lines $27\beta$ for the entire lengths in the display area AA. According to the configuration, the load capacitances of the first source lines $27\alpha$ and the second source lines $27\beta$ are equalized.

The third switch circuit 18 is disposed closer to the display area AA relative to the common signal source 17. In comparison to a configuration in which the common signal source is disposed closer to the display area AA relative to the third switch circuit 18, the length of the sections of the touch lines 31 connected to the third switch circuit 18 can be reduced. Therefore, the common signals transmitted through the touch lines 31 are less likely to be rounded.

The pixel electrodes 24 are connected to the source lines 27. The common electrode 25 is disposed to overlap the pixel electrodes 24 via the second interlayer insulator 41 (the insulator). The common electrode 25 includes the touch electrodes 30 (the position detecting electrodes) connected to the touch lines 31. The touch electrodes 30 and the position input member by which the position input operations are performed form the capacitors. The touch electrodes 30 are for detection of positions of inputs by the position input member. According to the configuration, the pixel electrodes 24 are charged based on the image signals transmitted through the source lines 27. The common signals that are supplied to the touch lines 31 by the common signal source 17 via the third switch circuit 18 in synchronization with the feedings of the image signals to the source lines 27 by the driver 12 and transmitted through the touch lines 31 are supplied to the common electrode 25. Potential differences may be created between the pixel electrodes 24 and the common electrode 25 overlapping the pixel electrodes 24 via the second interlayer insulator 41 based on the potentials at the pixel electrodes 24. The image display is performed using the potential differences. The touch signals that are supplied to the source lines 27 by the driver 12 via the second switch circuit 16 and transmitted through the touch lines 31 via the image signals are supplied to the touch electrodes 30 included in the common electrode 25. When the capacitors are formed between the touch electrodes 30 and the position input member by which the position input operations are performed, the positions of inputs by the position input member are detected.

Second Embodiment

A second embodiment of the technology described herein will be described with reference to FIGS. 15 to 17. The second embodiment includes a first switch circuit 115 and a second switch circuit 116 different from the first embodiment. Components, functions, and effects similar to those of the first embodiment previously described will not be described.

Figure 15:
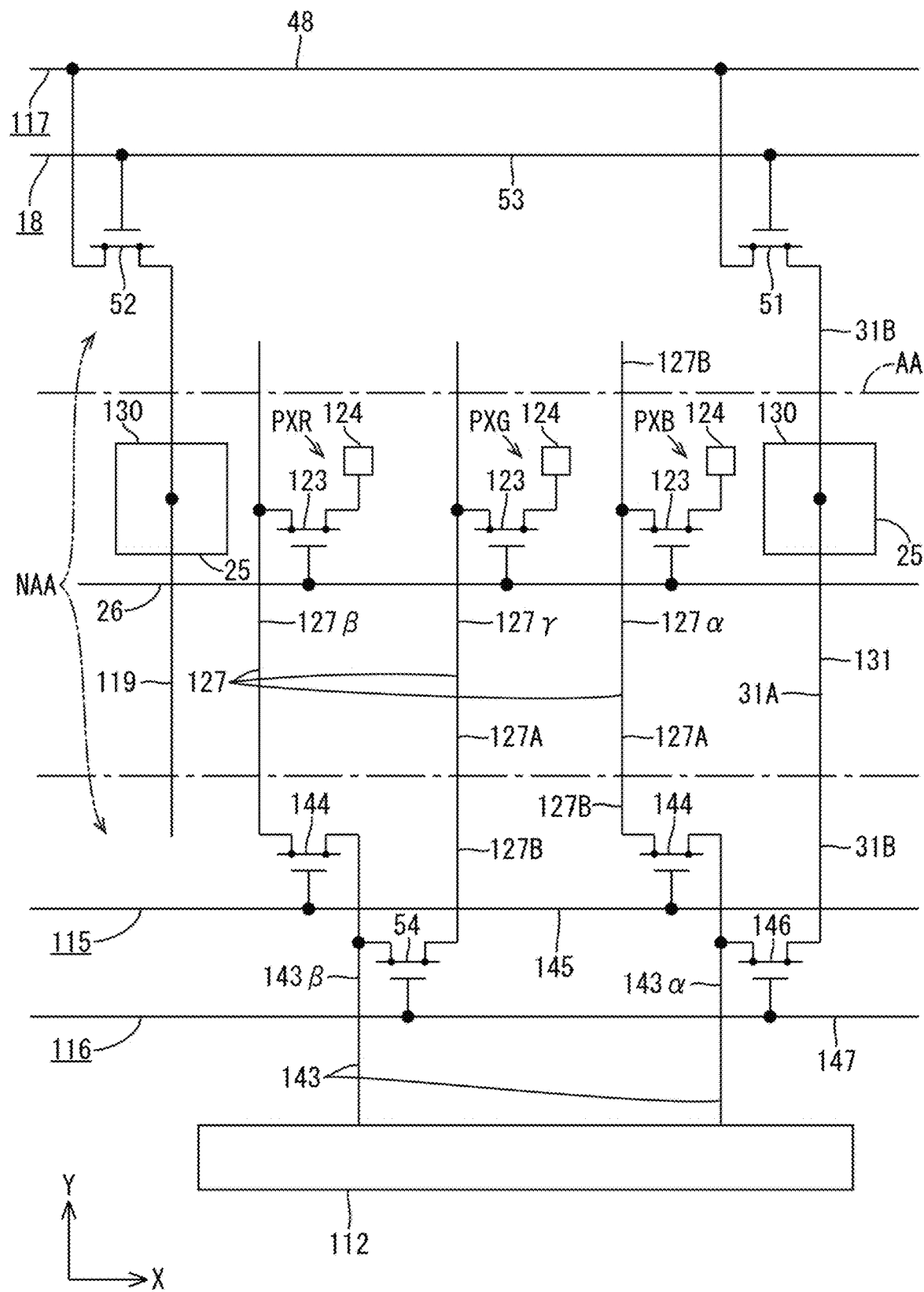
FIG. 15 is a circuit diagram illustrating an electrical configuration of an array substrate included in a liquid crystal panel according to a second embodiment.

As illustrated in FIG. 15, touch lines 131 and the some of the source lines 127 are connected to the second switch circuit 116 in this embodiment. The second switch circuit 116 includes second switch components 146 connected to the touch lines 131 and third switch components 54 connected to the source lines 127. The third switch components 54 have a configuration similar to the configuration of the second switch components 146 except for components to which the third switch components 54 are connected. The number of the source lines connected to the first switch circuit 115 (the number of first switch components 144) is equal to the total number of the source lines 127 minus the number of the source lines 127 connected to the second switch circuit 116.

As illustrated in FIG. 15, the connecting lines 143 drawn from a driver 112 include first connecting lines 143α and second connecting lines 143β. The first connecting lines 143α are connected to the first switch components 144 and the second switch components 146. The second connecting lines 14313 are connected to the first switch components 144 and the third switch components 54. The first connecting lines are indicated by reference sign 143α. The second connecting lines are indicated by reference sign 143β. The reference sign without the suffixes α and β will be used in descriptions of common structures and functions. The second connecting lines 143β are electrically connected to the different source lines 127 via the first switch components 144 and the third switch components 54. In comparison to a configuration in which all the source lines are electrically connected to the connecting lines 143 via the first switch components 144, respectively, the number of the connecting lines 143 can be reduced. Specifically, in the first embodiment, three connecting lines 43 are required for three source lines 27. In this embodiment, two connecting lines 143 are required from three source lines 127. Namely, the number of the connecting lines 143 is reduced to two-thirds in comparison to the first embodiment. The source lines 127 connected to the first connecting lines 143α via the first switch components 144 are defined as the first source lines 127α (the first image lines, the first overlapping image lines). The source lines 127 connected to the second connecting lines 143β via the first switch components 144 are defined as the second source lines 127β (the second image lines, the second overlapping image lines). The source lines 127 connected to the second connecting lines 143β via the third switch components 54 are defined as the third source lines 127γ (the third image lines). The first source lines are indicated by reference sign 127α. The second source lines are indicated by reference sign 127β. The third source lines are indicated by reference sign 127γ. The reference sign without the suffixes α, β and γ will be used in descriptions of common structures and functions.

As illustrated in FIG. 15, the driver 112 is configured to perform feedings of first image signals and second image signals to the second connecting lines 143β with time-division and image signals and common signals to the first connecting lines 143α with time-division. According to the configuration, the first image signals and the second image signals are supplied to the second connecting lines 143β with time-division by the driver 112. When a signal to turn on the first switch circuit 115 is supplied to a first switch line 145 in the first switch circuit 115 in synchronization with the feeding of the first image signals, the first switch components 144 turn on and the second connecting lines 143β are electrically connected to the source lines 127. As a result, the first image signals are supplied to the source lines 127. When a signal to turn on the second switch circuit 116 is supplied to a second switch line 147 in the second switch circuit 116 in synchronization with the feeding of the second image signals, the third switch components 54 turn on and the second connecting lines 14313 are electrically connected to the source lines 127. As a result, the second image signals are supplied to the source lines 127. The image signals and the common signals are supplied to the first connecting lines 143α with time-division by the driver 12. When a signal to turn on the first switch circuit 115 is supplied to the first switch line 145 in the first switch circuit 115 in synchronization with the feeding of the image signals, the first switch components 144 turn on and the first connecting lines 143α are electrically connected to the source lines 127. As a result, the image signals are supplied to the source lines 127. When a signal to turn on the second switch circuit 116 is supplied to the second switch line 147 in the second switch circuit 116 in synchronization with the feeding of the common signals, the second switch components 146 turn on and the first connecting lines 143a are electrically connected to the touch lines 131. As a result, the common signals are supplied to the touch lines 131. When a signal to turn on the second switch circuit 116 is supplied to the second switch line 147 in the second switch circuit 116 in synchronization with the position detection by the driver 112, the second switch components 146 turn on and the first connecting lines 143a are electrically connected to the touch lines 131. As a result, positions are detected by the driver 112 via the first connecting lines 143α and the touch lines 131.

As illustrated in FIG. 15, pixels PX disposed in the display area AA include blue pixels PXB (first pixels), red pixels PXR (second pixels), and green pixels PXG (third pixels). The blue pixels PXB include blue color filters. The red pixels PXR include red color filters. The green pixels PXG include green color filters. The pixels PXB, PXR, and PXG exhibit colors that are different from one another. The blue pixels are indicated by reference sign PXB. The red pixels are indicated by reference sign PXR. The green pixels are indicated by reference sign PXG. The reference sign without the suffixes B, R and G will be used in descriptions of common structures and functions. The first source lines 127α are connected to pixel electrodes 124 in the blue pixels PXB via the TFTs 123. The second source lines 127β are connected to the pixel electrodes 124 in the red pixels PXR via the TFTs 123. The third source lines 127γ are connected to the pixel electrodes 124 in the green pixels PXG via the TFTs 123. When the first switch components 144 in the first switch circuit 115 turn on in synchronization with the feedings of the image signals to the first connecting lines 143a and the second connecting lines 143β by the driver 112, the image signals supplied to the first connecting lines 143α by the driver 112 are transmitted to the first source lines 127α and the pixel electrodes 124 in the blue pixels PXB are charged. Furthermore, the image signals supplied to the second connecting lines 143β by the driver 112 are transmitted to the second source lines 127β and the pixel electrodes 124 in the red pixels PXR are charged. The second switch components 146 in the second switch circuit 116 are turned on in synchronization with the feedings of the common signals to the first connecting lines 143α and the image signals to the second connecting lines 143β by the driver 112. The common signals supplied to the first connecting lines 143α by the driver 112 are transmitted through the touch lines 131 and touch electrodes 130 are charged. The image signals supplied to the second connecting lines 143β by the driver 112 are transmitted through the third source lines 127γ and the pixel electrodes 124 in the green pixels PXG are charged. By turning on the first switch components 144 once and the third switch components 54 once, the different image signals are supplied to the blue pixels PXB, the red pixels PXR, and the green pixels PXG that exhibit colors that are different from one another. In comparison to a configuration in which three source lines are connected to pixels PXB, PXR, and PXG in three different colors are connected to one switch component and the image signals are distributed to the pixels PXB, PXR, and PXG in three different colors by turning on the switch component three times, each pixel PX can be charged for a longer period. The common signals are supplied to the touch lines 131 by the driver 112 in synchronization with the charging of the green pixels PXG. The touch electrodes 130 receive the common signals from the driver 112 and a common signals source 117. Therefore, the touch electrodes 130 are stably held at the potential. Differences are less likely to be created between the potential of the green pixels PXG charged at the potential based on the image signals and the potentials of the touch electrodes 130. Therefore, green display with a high luminosity is performed and high display quality is achieved.

Figure 16:
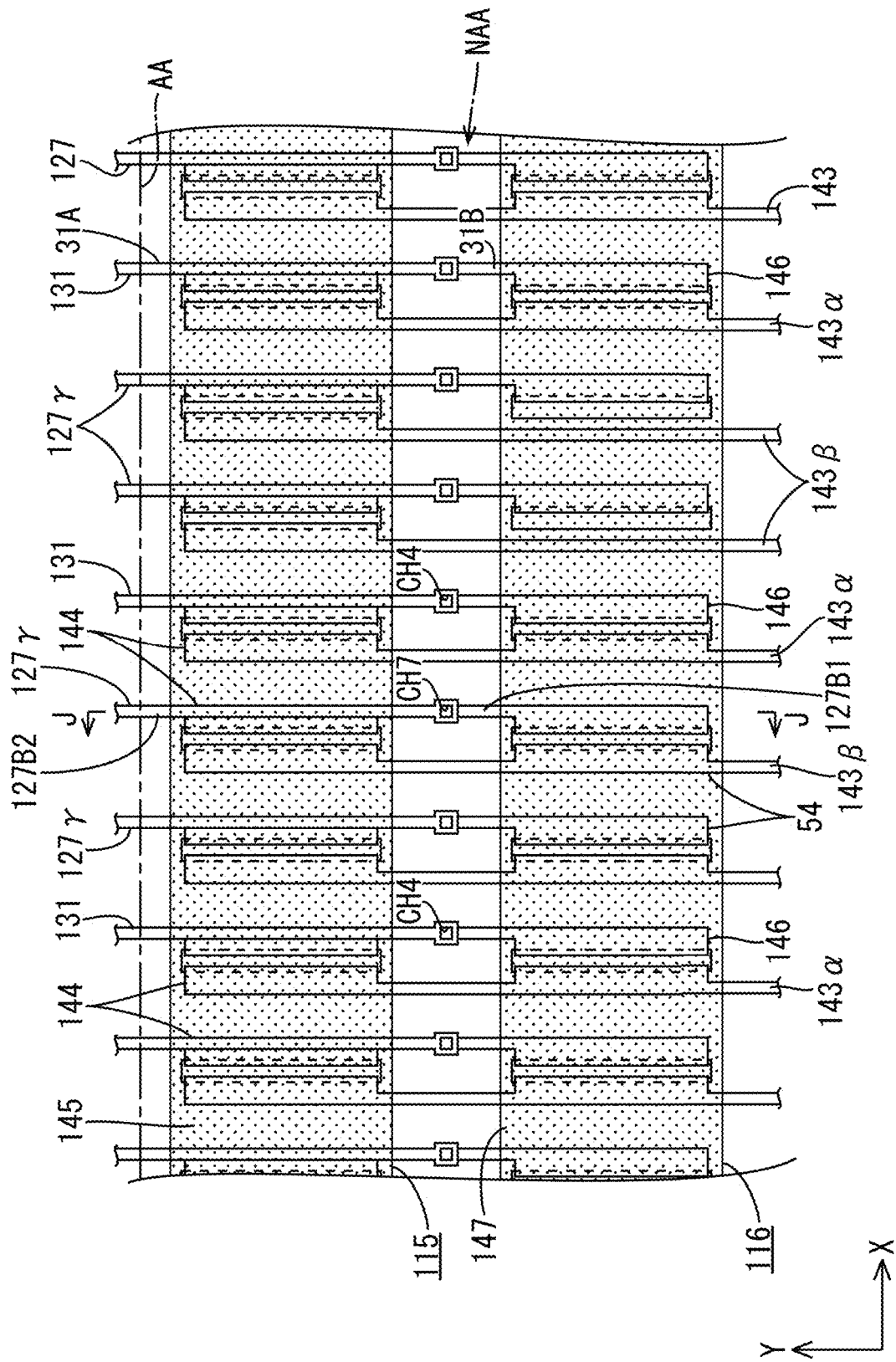
FIG. 16 is a plan view of a section of the array substrate including a first switch circuit and a second switch circuit.
Figure 17:
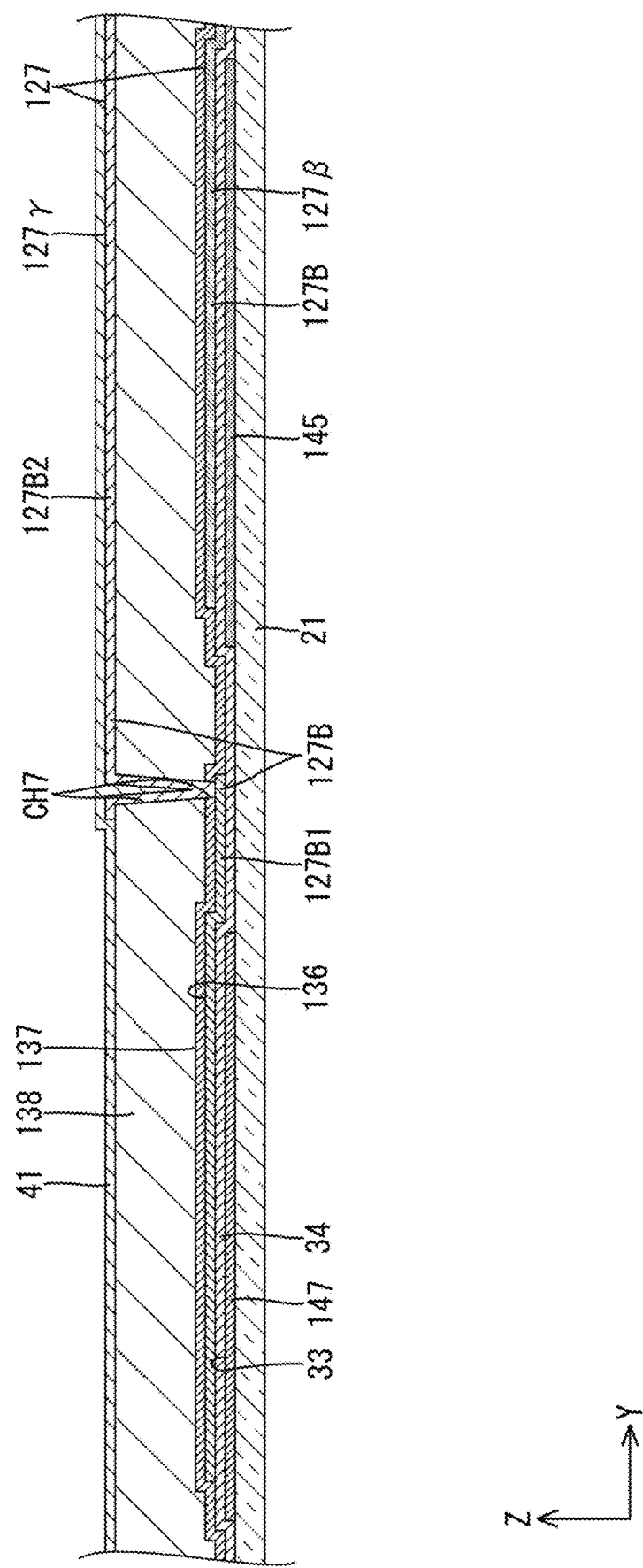
FIG. 17 is a cross-sectional view of the array substrate along line J-J in FIG. 16.

As illustrated in FIGS. 16 and 17, the first source lines 127α and the second source lines 127β include trunk portions 127A and lead portions 127B that are prepared from a second metal film 136, similar to the source lines 27 in the first embodiment. The third source lines 127y include trunk portions 127A that are prepared from the second metal film 136 (the conductive film) and lead portions 127B that include sections are prepared from the second metal film 136 and the rest of the sections are prepared from a third metal film 140 (the second conductive film). The lead portions 127B of the third source lines 127γ include first lead sections 127B1 prepared from the second metal film 136 and second lead sections 127B2 prepared from the third metal film 140. The first lead sections 127B1 and the second lead sections 127B2 of the lead portions 127B of the third source lines 127γ are disposed with ends thereof overlap each other. Sections of the first lead sections 127B1 and the second lead sections 127B2 overlapping each other are connected to each other via lead portion contact holes CH7 formed in a first interlayer insulator 137 and a planarization film 138 disposed therebetween. The second lead sections 127B2 of the lead portions 127B of the third source lines 127γ are disposed to overlap the lead portions 127B of the second source lines 127β. The second source lines 127β and third source lines 127γ are efficiently arranged. This configuration is preferable for improving the definition.

As described above, this embodiment includes connecting lines 143 drawn from the driver 112 and connected to the first switch circuit 115 and the second switch circuit 116. The multiple source lines 127 are provided. The first switch circuit 115 includes the first switch components 144 connected to the source lines 127. The second switch circuit 116 includes the second switch components 146 connected to the touch lines 131 and the third switch components 54 connected to the source lines 127. The connecting lines 143 include the first connecting lines 143α and the second connecting lines 143β. The first connecting lines 143α are connected to the first switch components 144 and the second switch components 146. The second connecting lines 143β are connected to the first switch components 144 and the third switch components 54. The driver 112 is configured to perform the feeding of the image signals to the second connecting lines with time-division. The driver 112 is configured to perform the feedings of the image signals and the common signals to the first connecting lines 143α with time-division. The first image signals and the second image signals are supplied to the second connecting lines 143β with time-division by the driver 112. When the second connecting lines 143β are electrically connected to the source lines 127 through the first switch components 144 in the first switch circuit 115 in synchronization with the feedings of the first image signals, the first image signals are supplied to the source lines 127. When the second connecting lines 143β are electrically connected to the source lines 127 through the third switch components 54 in the second switch circuit 116 in synchronization with the feedings of the second image signals, the second image signals are supplied to the source lines 127. The image signals and the common signals are supplied to the first connecting lines 143α with time-division by the driver 112. When the first connecting lines 143α are electrically connected to the source lines 127 through the first switch components 144 in the first switch circuit 115 in synchronization with the feedings of the image signals, the image signals are supplied to the source lines 127. When the first connecting lines 143α are electrically connected to the touch lines 131 through the second switch components 146 in the second switch circuit 116 in synchronization with the feedings of the common signals, the common signals are supplied to the source lines 127. The first connecting lines 143α are electrically connected to the touch lines 131 through the second switch components 146 in synchronization with the position detection by the driver 112. The positions are detected by the driver 112 via the first connecting lines 143α and the touch lines 131. The different source lines 127 are electrically connected to the second connecting lines 143β via the first switch components 144 and the third switch components 54. In comparison to a configuration in which all the source lines are electrically connected to the connecting lines 143 via the first switch components 144, respectively, the number of the connecting lines 143 can be reduced.

The pixels PX are disposed in the display area AA and connected to the source lines 127. The pixels PX includes the blue pixels PXB (the first pixels), the red pixels PXR (the second pixels), and the green pixels PXG (the third pixels).

The blue pixels PXB are connected to the source lines 127 (the first source lines 127α) to which the image signals are transmitted from the first connecting lines 143α via the first switch components 144. The red pixels PXR are connected to the source lines 127 (the second source lines 127β) to which the image signals are transmitted from the second connecting lines 143β via the first switch components 144. The green pixels PXG are connected to the source lines 127 (the third source lines 127γ) to which the image signals are transmitted from the second connecting lines 143β via the third switch components 54. The blue pixels PXB, the red pixels PXR, and the green pixels PXG exhibit colors that are different from one another. According to the configuration, the second connecting lines 143β are electrically connected to the source lines 127 through the first switch components 144 in synchronization with the feedings of the image signals to the second connecting lines 143β with time-division by the driver 112. Furthermore, when the second connecting lines 143β are electrically connected to the source lines 127 through the third switch components 54, the red pixels PXR and the green pixels PXG, which exhibit colors that are different from one another, are charged to the potentials based on the image signals. The first connecting lines 143α are electrically connected to the source lines 127 through the first switch components 144 in synchronization with the feedings of the image signals and the common signals to the first connecting lines 143α with time-division by the driver 112. Furthermore, the first connecting lines 143α are electrically connected to the touch lines 131 through the second switch components 146. As a result, the blue pixels PXB are charged to the potentials based on the image signals and the touch electrodes 130 are charged to the potentials based on the common signals. By turning on the first switch components 144 once and the third switch components 54 once, the different image signals are supplied to the blue pixels PXB, the red pixels PXR, and the green pixels PXG, respectively. In comparison to a configuration in which the three source lines connected to the pixels PXB, PXR, and PXG in three different colors are connected to one switch component and the image signals are distributed to the pixels PXB, PXR, and PXG in three colors by turning on the switch component three times, each pixel PX can be charged for a longer period.

The green pixels PXG exhibit the green color. In comparison to other colors including the blue color and the red color, the green color has a higher luminosity. In comparison to the pixels PXG and PXR in other colors, differences between the potentials based on the image signals supplied to the green pixels PXG and the potentials based on the common signals supplied to the green pixels PXG tend to more significantly affect the image display. The green pixels PXG are charged in synchronization with the feedings of the common signals to the first connecting lines 143α by the driver 112. Therefore, the common signals supplied to the touch lines 131 are stable and thus the differences between the potentials of the green pixels PXG and the potentials based on the common signals are less likely to be created. According to the configuration, the high display quality is maintained.

The source lines 127 include the first source lines 127α, the second source lines 127β, and the third source lines 127γ. The image signals are transmitted from the first connecting lines 143α to the first source lines 127α via the first switch components 144. The image signals are transmitted from the second connecting lines 143β to the second source lines 127β via the first switch components 144. The image signals are transmitted from the second connecting lines 143β to the third source lines 127γ (the third image lines) via the third switch components 54. The first source lines 127α and the second source lines 127β include the trunk portions 127A disposed at least in the display area AA and the lead portions 127B drawn from the ends of the trunk portions 127A. The trunk portions 127A and the lead portions 127B are prepared from the second metal film 136 (the conductive film). The third source lines 127γ include the trunk portions 127A and the first lead sections 127B1, which are the sections of the lead portions 127B, prepared from the second metal film 136. The third source lines 127γ include the second lead sections 127B2, which are the rest of the sections of the lead portions 127B, prepared from the third metal film 140 (the second conductive film) disposed such that the first interlayer insulator 137 and the planarization film 138 are disposed between the second metal film 136 and the third metal film 140. The second lead sections 127B2 are connected to the first lead sections 127B1 via the lead section contact holes CH7 (the contact holes) formed in the first interlayer insulator 137 and the planarization film 138 that are the insulators. The second lead sections 127B2 of the third source lines 127γ are disposed to overlap the lead portions 127B of the second source lines 127β. The trunk portions 127A and the first lead sections 127B1 of the third source lines 127γ are prepared from the second metal film 136. The second lead sections 127B2 are prepared from the third metal film 140. The sections of the first lead sections 127B1 and the second lead sections 127B2 overlapping each other are connected to each other via the lead section contact holes CH7 formed in the first interlayer insulator 137 and the planarization film 138 that are the insulators disposed therebetween. The lead portion 127B of each second source line 127β and the second lead section 127B2 of the corresponding third source line 127γ connected to the same second connecting line 143β via the corresponding first switch component 144 and the corresponding third switch component 54 are disposed to overlap each other. In comparison to a configuration in which the lead portions of the second source lines and the third source lines are prepared from the second metal film 136 and disposed not to overlap each other, the lead portions 127B of the second source lines 127β and the second lead sections 127B2 of the third source lines 127γ are efficiently arranged. This configuration is preferable for improving the definition.

Other Embodiments

The technology described herein is not limited to the embodiments described above and illustrated by the drawings. For example, the following embodiments will be included in the technical scope of the technology described herein.

(1) In each of the above embodiments, the common lines are connected to the third switch circuit but not to the second switch circuit. However, the common lines may be omitted. In such a configuration, the touch lines connected to the second switch circuit and the third switch circuit may be disposed to overlap all of the source lines. During the sensing periods, the position detection may be performed using all of the touch lines or some of the touch lines. Alternatively, the touch lines may be disposed to overlap some of the source lines.

(2) If the common lines are omitted as described in (1), dummy common lines prepared from the third metal film from which the touch lines are prepared may be provided to overlap the touch lines with which the source lines do not overlap. The dummy common lines may not be connected to the third switch circuit and may be electrically isolated from the third switch circuit. Other features of the dummy common lines may be the same as the features of the common lines in the embodiments described above.

(3) In each of the above embodiments, the touch lines or the common lines are disposed to overlap all of the source lines. However, the touch lines and the common lines may not overlap some of the source lines. The dummy common lines described in (2) may be disposed to overlap the source lines with which the touch lines and the common lines do not overlap.

(4) In each of the above embodiments, the touch lines are connected to the second switch circuit and the third switch circuit. However, the touch lines may be connected to the second switch circuit but not to the third switch circuit. In such a configuration, the touch lines may not have common signal transmitting functions and may have only the position detection functions. In such a configuration, the common signals supplied by the third switch circuit are transmitted to the touch electrodes through the common lines.

(5) In each of the above embodiments, the first switch circuit is disposed adjacent to the display area and the second switch circuit is disposed away from the display area. However, the first switch circuit may be disposed away from the display area and the second switch circuit may be disposed adjacent to the display area.

(6) In each of the above embodiments, the third switch circuit is disposed adjacent to the display area and the common signal source is disposed away from the display area. However, the third switch circuit may be disposed away from the display area and the common signal source may be disposed adjacent to the display area.

(7) In each of the above embodiments, the driver is configured to perform the feeding of the common signal at least once during the one-frame display period. However, the driver may be configured to perform the feedings of the common signals multiple times during the on-frame display period.

(8) In each of the above embodiments, the detector circuit for the position detection is included in the driver. However, the detector circuit may be included in a device other than the driver (e.g., the control circuit board).

(9) In the first embodiment, the second source lines that overlap the common lines but not the touch lines are connected to the first switch components. However, the second source lines that overlap the common lines but not the touch lines may be directly connected to the driver. In such a configuration, the number of the first switch components can be reduced.

(10) In the second embodiment, the source lines (the third source lines) connected to the pixel electrodes in the green pixels via the TFTs are connected to the third switch components. However, the source lines connected to the pixels electrodes in the red pixels or the green pixels may be connected to the third switch components via the TFTs. In such a configuration, the colors of the pixel electrodes to which the source lines connected to the first switch components and the source lines connected to the second switch components may be altered where appropriate.

(11) In the second embodiment, the source lines connected to the switch components are connected to the pixel electrodes in the pixels in the specific color via the TFTs. However, the source lines connected to the switch components may be connected to the pixel electrodes in the pixels in different colors.

(12) In each of the above embodiments, the pixel electrodes are prepared from the first transparent electrode film and the common electrodes and the touch electrodes are prepared from the second transparent electrode film. However, the pixel electrodes may be prepared from the second transparent electrode film and the common electrodes and the touch electrodes may be prepared from the first transparent electrode film. In such a configuration, it is preferable that the pixel electrodes include holes for controlling the orientation of the liquid crystal molecules.

(13) In each of the above embodiments, the common lines and the touch lines are disposed to overlap the source lines for the entire length. However, the common lines and the touch lines may be disposed to overlap sections of the source lines in the extending direction.

(14) In each of the above embodiments, the common lines and the touch lines are disposed to overlap the source lines. However, the common lines and the touch lines may be disposed not to overlap the source lines. In such a configuration, the common lines and the touch lines may be prepared from the second metal film from which the source lines are prepared.

(15) In each of the above embodiments, the bottom gate type TFTs are used for the TFTs and the switch components. However, top gate type TFTs may be used.

(16) In each of the above embodiments, the number of colors of the color filters and the pixels is three. However, the number of colors may be altered where appropriate.

(17) The materials of the metal films, the insulators, the semiconductor film, and the transparent electrode films in the array substrate may be altered from those of the above embodiments. The number of layers of the insulators in the array substrate may be altered where appropriate.

(18) In each of the above embodiments, a single driver is mounted on the array substrate. However, the number of drivers mounted on the array substrate may be altered where appropriate.

(19) In each of the above embodiments, the gate circuits are provided on the array substrate. However, the gate circuits may be omitted and a gate driver having a similar function as the gate circuits may be mounted on the array substrate. The gate circuits may be disposed on one side of the array substrate.

(20) The two-dimensional shape of the pixel overlapping holes in the common electrodes may be altered from that in each of the above embodiments where appropriate. The two-dimensional shape of the pixel overlapping holes may be a V shape. Then number and the intervals of the pixel overlapping holes may be altered where appropriate.

(21) In each of the above embodiments, the TFTs are two-dimensionally arranged in the matrix on the array substrate. However, the TFTs may be two-dimensionally arranged in zigzags. In such a configuration, pixel electrodes in pixels that exhibit different colors may be connected to each source line via TFTs arranged in zigzags.

(22) In each of the above embodiments, the light blocking portion is provided on the CF substrate. However, the light blocking portion may be provided on the array substrate.

(23) The semiconductor film from which the channels of the TFTs are prepared may be made of polysilicon other than the material used in each of the above embodiments. In such a configuration, bottom gate type TFTs may be used for the TFTs or top gate type TFTs including light blocking films below channels (on a side on which the backlight unit is disposed).

(24) In each of the above embodiments, the touch panel pattern uses the projected capacitance method. However, the touch panel pattern may use a mutual capacitance method.

(25) In each of the above embodiments, the transmissive liquid crystal panel is provided as an example. However, the technology described herein may be applied to reflective liquid crystal panels and semitransmissive liquid crystal panels.

(26) In each of the above embodiments, the two-dimensional shape of the liquid crystal display device (the liquid crystal panel or the backlight unit) is the horizontally-long rectangular shape. However, the two-dimensional shape of the liquid crystal display device may be vertically-long rectangular shape, a circular shape, a semicircular shape, an oval shape, an elliptic shape, a trapezoidal shape, or other shapes.

(27) In each of the above embodiment sections, the liquid crystal display device including the liquid crystal panel for a display panel is described. However, an organic EL display device including an organic EL display panel for a display panel may be used.

The invention claimed is:

1. A display device comprising:
   at least one image line disposed in a display area in which an image is displayed;
   at least one position detecting line disposed in the display area;
   a signal processor disposed outside the display area and configured to perform a feeding of an image signal and position detection with time-division;
   a first switch circuit disposed on a signal processor side relative to the display area outside the display area, connected to the at least one image line and the signal processor, and configured to electrically connect the at least one image line to the signal processor in synchronization with the feeding of the image signal by the signal processor;
   a second switch circuit disposed on a signal processor side relative to the display area outside the display area, connected to the at least one position detecting line and the signal processor, and configured to electrically connect the at least one position detecting line to the signal processor in synchronization with the position detection by the signal processor;
   a common signal source disposed on an opposite side from the signal processor relative to the display area outside the display area and configured to feed a common signal; and
   a third switch circuit disposed on an opposite side from the signal processor relative to the display area outside the display area, connected to the at least one position detecting line and the common signal source, and configured to electrically connect the at least one position detecting line to the common signal source in synchronization with the feeding of the image signal by the signal processor.

2. The display device according to claim 1, wherein
   the signal processor is configured to perform a feeding of the common signal during a one-frame display period during which the image is displayed in the display area,
   the second switch circuit is configured to electrically connect the at least one position detecting line to the signal processor in synchronization with the feeding of the common signal by the signal processor, and
   the third switch circuit is configured to electrically connect the at least one position detecting line to the common signal source in synchronization with the feeding of the common signal by the signal processor.

3. The display device according to claim 1, wherein the first switch circuit is disposed closer to the display area relative to the second switch circuit.

4. The display device according to claim 1, further comprising connecting lines drawn from the signal processor and connected to the first switch circuit and the second switch circuit, wherein
   the at least one image line includes image lines,
   the at least one position detecting line includes position detecting lines,
   the first switch circuit includes first switch components connected to the image lines and the connecting lines, and
   the second switch circuit includes second switch components connected to the position detecting lines and the connecting lines.

5. The display device according to claim 1, further comprising connecting lines drawn from the signal processor and connected to the first switch circuit and the second switch circuit, wherein
   the at least one image line includes image lines,
   the first switch circuit includes first switch components connected to the image lines and the connecting lines,
   the second switch circuit includes at least one second switch component and at least one third switch component,
   the at least one second switch component is connected to the at least one position detecting line,
   the at least one third switch component is connected to one of the connecting lines,
   the connecting lines include first connecting lines and second connecting lines,
   the first connecting lines are connected to the first switch components and the at least one second switch component,
   the second connecting lines are connected to the first switch components and the at least one third switch component, and
   the signal processor is configured to perform the feeding of the image signal to the second connecting lines with time-division and to perform the feedings of the image signal and the common signal to the first connecting lines with time-division.

6. The display device according to claim 5, further comprising pixels disposed in the display area and connected to the image lines, wherein
   the pixels include a first pixel, a second pixel, and a third pixel,
   the first pixel is connected to one of the image lines to which the image signal is transmitted from the first connecting line via the first switch component,
   the second pixel is connected to one of the image lines to which the image signal is transmitted from the second connecting line via the second switch component,
   the third pixel is connected to one of the image lines to which the image signal is transmitted from the second connecting line via the third switch component, and
   the first pixel, the second pixel, and the third pixel are configured to exhibit colors that are different from one another.

7. The display device according to claim 6, wherein the third pixel is configured to exhibit a green color.

8. The display device according to claim 5, wherein
   the image lines include a first image line to which the image signal is transmitted from the first connecting line via the first switch component, a second image line to which the image signal is transmitted from the second connecting line via the first switch component, and a third image line to which the image signal is transmitted from the second connecting line via the third switch component, the first image line and the second connecting line include trunk portions disposed in the display area and lead portions drawn from ends of the trunk portions, at least the trunk portions and the lead portions include sections of a conductive film, the third image line include a trunk portion and a lead portion, the trunk portion and a first lead section that is a section of the lead portion include sections of the conductive film, the lead portion includes a second lead section that is a rest of the lead portion including a section of a second conductive film disposed with an insulator between the conductive film and the second conductive film, the second lead section is connected to the first lead section via a contact hole formed in the insulator, and the second lead section of the third image line is disposed to overlap the lead portion of the second image line.

9. The display device according to claim 1, further comprising common lines disposed in the display area and connected to the third switch circuit, wherein the third switch circuit is configured to electrically connect the common signal source to the common lines in synchronization with the feeding of the image signal by the signal processor.

10. The display device according to claim 9, wherein
a number of the position detecting lines is smaller than a number of the image lines,
the position detecting lines are disposed in a layer in which the common lines are disposed,
the image lines include first overlapping image lines and second overlapping image lines, and
the first overlapping image lines are disposed to overlap the position detecting lines via an insulator, and
the second overlapping image lines are disposed to overlap the common lines via the insulator.

11. The display device according to claim 10, wherein the first overlapping image line and the second overlapping image line are connected to the first switch circuit.

12. The display device according to claim 10, wherein
a number of the first overlapping image lines is equal to a number of the position detecting lines, and
a number of the second overlapping image lines is equal to a number of the common lines.

13. The display device according to claim 10, wherein the position detecting lines and the common lines are disposed to overlap the first overlapping image lines and the second overlapping image lines for entire lengths thereof in the display area.

14. The display device according to claim 1, wherein the third switch circuit is disposed closer to the display area relative to the common signal source.

15. The display device according to claim 1, further comprising:
pixel electrodes connected to the at least one image line; and
a common electrode disposed to overlap the pixel electrodes via an insulator, the common electrode including position detecting electrodes connected to the at least one position detecting line, each of the position detecting electrodes being configured to form a capacitor with a position input member by which a position input operation is performed to detect a position of input by the position input member.

* * * * *